United States Patent
Stahlfeld

(10) Patent No.: US 11,495,058 B2
(45) Date of Patent: *Nov. 8, 2022

(54) MOTION BASED ACCOUNT RECOGNITION

(71) Applicant: Google LLC, Mountain View, CA (US)

(72) Inventor: Phillip Ellsworth Stahlfeld, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 172 days.

This patent is subject to a terminal disclaimer.

(21) Appl. No.: 16/937,161

(22) Filed: Jul. 23, 2020

(65) Prior Publication Data

US 2020/0356796 A1 Nov. 12, 2020

Related U.S. Application Data

(63) Continuation of application No. 15/719,463, filed on Sep. 28, 2017, now Pat. No. 10,740,635.

(51) Int. Cl.
*G06K 9/00* (2022.01)
*G06V 40/70* (2022.01)
(Continued)

(52) U.S. Cl.
CPC ............. *G06V 40/70* (2022.01); *G06F 3/011* (2013.01); *G06Q 30/016* (2013.01); *G06Q 30/02* (2013.01); *G06V 20/52* (2022.01); *G06V 40/166* (2022.01); *G06V 40/172* (2022.01); *G06V 40/23* (2022.01); *G06V 40/28* (2022.01); *G11B 27/10* (2013.01); *G06V 2201/10* (2022.01)

(58) Field of Classification Search
CPC .................................................. G06V 10/235
See application file for complete search history.

(56) References Cited

U.S. PATENT DOCUMENTS

| 2008/0162406 A1 | 7/2008 | St. John-Larkin |
| 2009/0041298 A1 | 2/2009 | Sandler et al. |

(Continued)

FOREIGN PATENT DOCUMENTS

WO WO 2016/054226 4/2016

OTHER PUBLICATIONS

International Search Report and Written Opinion for PCT/US2018/037423, dated Aug. 24, 2018, 12 pages.

*Primary Examiner* — Hadi Akhavannik
(74) *Attorney, Agent, or Firm* — Dority & Manning, P.A.

(57) ABSTRACT

A user establishes an account with an account management system and downloads a service application on a user computing device associated with the user. The user enters a service provider location and signs into a service application. A service camera device captures a video feed of one or more users within a visual field of the service camera device and a service computing device compares movement data received from user computing devices at the service provider location against movement of detected objects in the video feed to identify one or more users in the video feed. After identifying the one or more users within the video feed of the service camera device, in response to a particular user initiating a service request at the service computing device, the service computing device identifies the particular user at the service computing device as being within a service area of the video feed.

20 Claims, 13 Drawing Sheets

(51) Int. Cl.
*G06Q 30/00* (2012.01)
*G06F 3/01* (2006.01)
*G11B 27/10* (2006.01)
*G06Q 30/02* (2012.01)
*G06V 20/52* (2022.01)
*G06V 40/20* (2022.01)
*G06V 40/16* (2022.01)

(56) References Cited

U.S. PATENT DOCUMENTS

| | | | |
|---|---|---|---|
| 2013/0035979 A1* | 2/2013 | Tenbrock | G06Q 30/02 |
| | | | 705/7.29 |
| 2013/0063550 A1* | 3/2013 | Ritchey | G09G 5/026 |
| | | | 345/207 |
| 2013/0069931 A1 | 3/2013 | Wilson et al. | |
| 2013/0100307 A1 | 4/2013 | Curcio et al. | |
| 2013/0258117 A1 | 10/2013 | Penov et al. | |
| 2013/0332860 A1 | 12/2013 | Jin et al. | |
| 2014/0028787 A1 | 1/2014 | Banno | |
| 2014/0201126 A1* | 7/2014 | Zadeh | A61B 5/165 |
| | | | 706/52 |
| 2015/0085111 A1 | 3/2015 | Lavery | |
| 2015/0163764 A1 | 6/2015 | Stern et al. | |
| 2016/0057090 A1 | 2/2016 | Faaborg | |

* cited by examiner

MOTION BASED ACCOUNT RECOGNITION

RELATED APPLICATIONS

The present application is a continuation of U.S. patent application Ser. No. 15/719,463, titled "Motion Based Account Recognition," filed Sep. 28, 2017, now issued as U.S. Pat. No. 10,740,635. Applicant claims priority to and the benefit of U.S. application Ser. No. 15/719,463 and hereby incorporates such application by reference herein in its entirety.

The present disclosure relates to identifying user accounts for use in service requests based on facial recognition of users and correlating motion data from user computing devices to a video feed.

TECHNICAL FIELD

The present disclosure relates to identifying user accounts for use in service requests based on facial recognition of users and correlating motion data received from user computing devices to a video feed.

BACKGROUND

When users are provided with services at a service provider location, many methods of conducting service requests are available. Consumers may use many different cards or accounts. The user account identifiers and other data represented by the cards may be communicated to the service provider system via magnetic stripes, near field communication technologies involving user computing devices, and other suitable mechanisms.

Current applications for conducting service requests at a service provider system location do not provide the opportunity for the user to make a hands-free service request and instead require the user to interact with a user computing device. Additionally, current applications require the user to perform actions to identify himself or herself by providing user account identifiers or other data to the service provider system.

SUMMARY

Techniques herein provide computer-implemented methods to conduct a hands-free service request with facial recognition and movement recognition. In an example, a service provider system registers with an account management system. A user establishes an account with the account management system and transmits an image of himself to the account management system to establish a facial template associated with the user account. A user signs into the service application via the user computing device and enters the service provider system location. The user computing device receives a service beacon device identifier from the service beacon device and transmits the identifier to the account management system. The account management system transmits to the service computing device facial templates corresponding to other users whose user computing devices are within network range of the service beacon device and who are signed in to the service application. The service camera device captures a facial image of the user and the service computing device identifies the user by comparing the facial image captured by the service camera device against the received facial templates. The service computing device also compares movement data received from the account management system for user computing devices at the service provider system location against movement of users recorded by the service camera device to identify one or more users in the visual field of the service camera device. After identifying the one or more users within the visual field of the service camera device, in response to a particular user initiating a service request at the service computing device, the service computing device identifies the particular user based on a proximity to a designated service area in the video feed. The service computing device operator selects an account of the identified user for use in a service request from one or more displayed accounts of the user. The service provider device transmits service request details to the account management system, which generates a service request authorization request.

In certain other example aspects described herein, systems and computer program products to conduct a hands-free service request with facial recognition and movement recognition are provided.

These and other aspects, objects, features, and advantages of the examples will become apparent to those having ordinary skill in the art upon consideration of the following detailed description of illustrated examples.

DETAILED DESCRIPTION OF EXAMPLES

Overview

Figure 1:
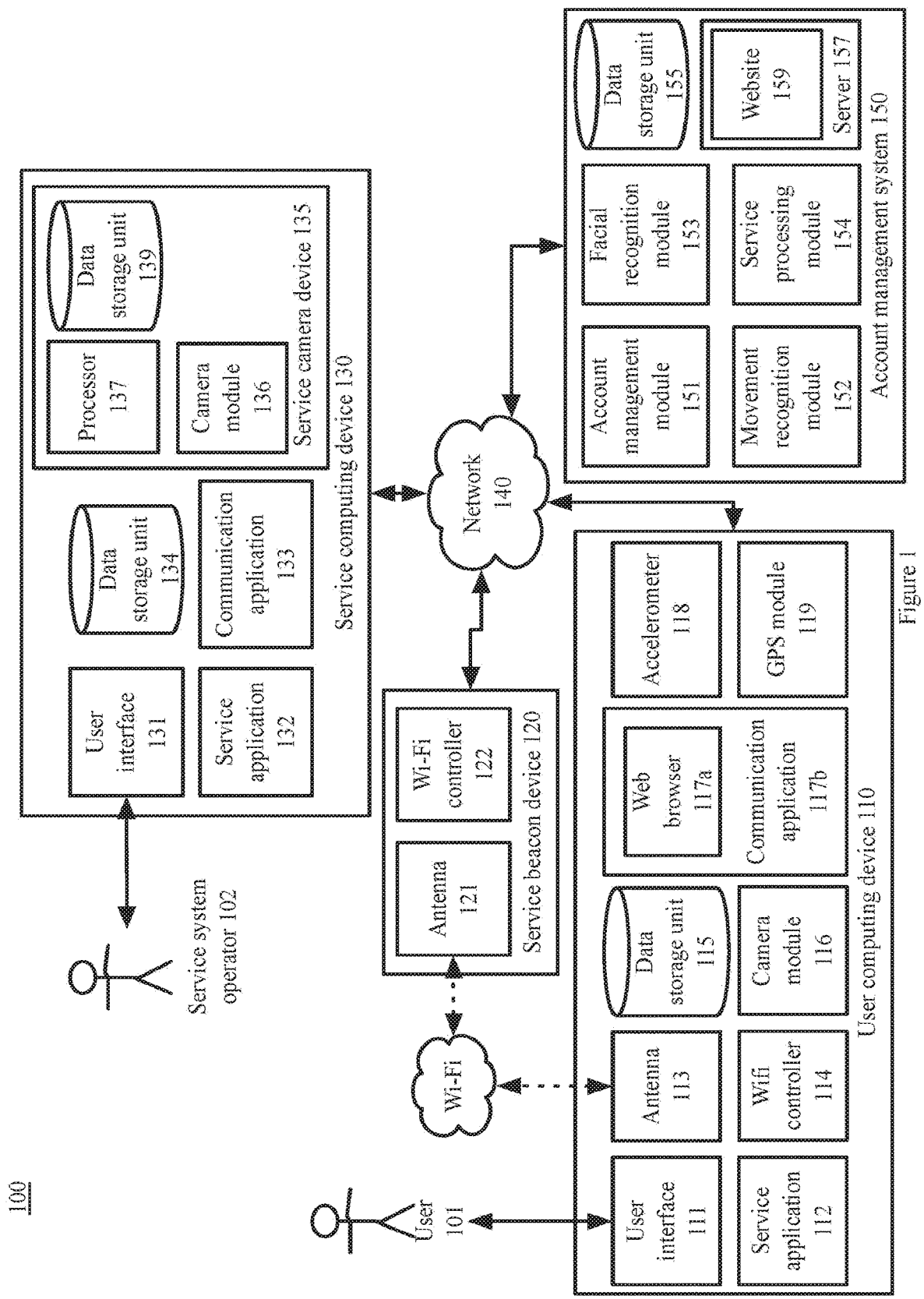
FIG. 1 is a block diagram depicting a system for conducting a hands-free service request with facial recognition and movement recognition of users, in accordance with certain examples.

The examples described herein provide computer-implemented techniques for conducting a hands-free service request with facial recognition and movement recognition.

In an example, a service provider system registers with an account management system. The service provider system installs one or more service beacon devices, one or more service computing devices, and one or more service camera devices at a service provider system location. A user establishes an account with the account management system and downloads a service application on a user computing device associated with the user. In an example, the user transmits an image of himself to the account management system to establish a facial template associated with the user account. The user enters a service provider system location and signs into the service application via the user computing device. The user computing device receives a service beacon device identifier from the service beacon device and transmits the identifier to the account management system. The account management system transmits to the service computing device facial templates corresponding to users whose user computing devices are within network range of the service beacon device and who are signed in to the service application. The service camera device captures facial images of one or more users within a visual field of the service camera device. The service computing device identifies the one or more users based on comparing the facial images captured by the service camera device against the received facial templates. The service camera device also compares movement data received from the account management system for user computing devices at the service provider system location against movement of users recorded by the service camera device to identify one or more users in the visual field of the service camera device. After identifying the one or more users within the visual field of the service camera device and in response to a particular user initiating a service request at the service computing device, the service computing device identifies the particular user at the service computing device. In an example, the service computing device displays one or more accounts of the identified particular user. The service computing device operator selects an account of the identified particular user for use in a service request. The service computing device transmits service request details to the account management system, which generates a service request authorization request to transmit to an issuer system associated with the user account selected for use in the service request. The account management system receives an approval of the service request authorization request and transmits a receipt to the service computing device.

In an example, the service computing device displays one or more accounts of the identified particular user. The service computing device operator selects an account of the identified particular user for use in a service request. The service computing device transmits service request details to the account management system, which generates a service request authorization request to transmit to an issuer system associated with the user account selected for use in the service request. The account management system receives an approval of the service request authorization request and transmits a receipt to the service computing device.

In an example, a service provider system registers with an account management system. A service computing device operator installs a service application on a service computing device. In another example, the service computing device operator installs the service application on a plurality of service computing devices at a service provider system location. A service beacon device receives a beacon identifier code from an account management system. The service beacon device broadcasts the beacon identifier code via wireless communication at the service provider system location. The service computing device operator installs a service camera device at the service provider system location to correspond to the service computing device. The account management system receives a service computing device identifier corresponding to a service computing device and associates it with a corresponding beacon identifier of the service beacon device.

In an example, the user registers with an account management system. For example, the user accesses an account management system website via a user computing device associated with the user. The user registers with the account management system and downloads a service application onto the user computing device In an example, the account management system establishes a facial template associated with the user account. The account management system creates a facial template associated with the user account based on the received facial image. The account management system deletes the received facial image.

In an example, the user signs in to a service application on the user computing device. The user carries the user computing device within a threshold distance of a service beacon device at the service provider system location. The user computing device receives a service beacon device identifier broadcast by the service beacon device and transmits the received service beacon device identifier and a user account identifier to the account management system. The account management system receives the service beacon device identifier and the user account identifier. The account management system extracts a facial template associated with the user account identifier and identifies a service camera device associated with the service beacon device identifier. The account management system transmits a facial template of the identified user to the service computing device associated with the service beacon device identifier. For example, a facial template associated with the identified user's account is transmitted to the service computing device. The service computing device receives the facial template of the user. The service computing device adds the facial template of the user to a current customer log. The service computing device periodically updates the current customer log based on updates received from the account management system. The service computing device captures video of the user via the service camera device. The service computing device receives the video feed of the service camera device and extracts a facial image of the user from the captured video and generates a facial template from the captured facial image. The service computing device deletes the received video feed and extracted facial image. The service computing device retrieves facial templates from the current customer log. The service camera device compares the generated facial template from the extracted facial image to facial templates from the current customer log. The service camera device is able to identify the user if there is a match between a facial template from the current customer log and the generated facial template. The service camera device is unable to identify the user if there is no match between a facial template from the current customer log and the generated facial template. In an example, if the service camera device is able to identify the user, the service camera device notifies the account management system of the identity of the user In another example, if the service camera device is able to identify the user, the service camera device notifies the service computing device of the identity of the user. In an example, the service computing device identifies one or more users from the video feed based on facial recognition.

In an example, instead of or in addition to using facial recognition, the service computing device compares the received video feed with movement data of user computing devices received from the account management system to identify users in the video feed. In other examples, the account management system compares the video feed with the movement data to identify users in the video feed. For example, in addition to transmitting a beacon device identifier to the account management system, each user computing device at the service system location transmits movement data logged by the user computing device. In an example, each user computing device continuously or periodically transmits logged movement data to the service computing device via a wireless communication channel if the user is signed in to the service application. In an example, if the user is not signed in to the service application, the user computing device does not transmit logged movement data to the service computing device via the wireless communication channel. In other examples, the user computing device continuously or periodically transmits logged movement data to the account management system via the network when the user is signed in to the service application on the user computing device. Example movement data comprises accelerometer data and/or gyroscopic data of the user computing device, a user computing device identifier, and timestamp data. For example, movement data comprises a velocity of the user computing device, an acceleration of the user computing device, an orientation of the user computing device, a rotation rate of the user computing device, or other data that describes or indicates an orientation, position, or a movement of the user computing device. For example, timestamp data comprises a current time comprising a year, month, date, hour of the day, minute of the hour, second of the minute, millisecond of the second, and/or other appropriate indication or indications of the time at which the timestamp is generated In an example, the service computing device receives the movement data from user computing devices at the service provider location via the wireless communication channel. The service computing device compares a received video feed with received movement data of user computing devices to identify users in the video feed. In an example, the service computing device receives a continuous video feed from the service computing device comprising video captured of an area of the service provider system location Example video feed data comprises timestamp data. In an example, the service computing device defines a location of the area captured by the video feed associated with a service request area and determines an identity of the user computing device within the service request area based on a received user computing device identifier. In an example, the video feed comprises multiple service request areas, each service request area associated with a particular service computing device.

In an example, the account management system receives the movement data from each user computing device at the service provider system location via the network In this example, the account management system receives a video feed from the service computing device and compares the received video feed with the movement data of user computing devices to identify users in the video feed. In this example, the account management system transmits identities of the users identified in the video feed to the service computing device. In another example, the account management system transmits the received movement data to the service computing device at the service provider location. In this other example, the service computing device compares the received video feed with movement data of user computing devices received from the account management system to identify users in the video feed. In an example, the service computing device defines a location of the area captured by the video feed associated with a service request area and determines an identity of the user within the service request area. In an example, the video feed comprises multiple service request areas, each service request area associated with a particular service computing device. In this example, the service computing device or account management system determines an identity of a particular user within each service request area associated with each particular corresponding service computing device.

In an example, the service computing device or the account management system may be trained to identify users in a video feed based on movement data received from user computing devices. For example, a service application on each user computing device at the service provider system location logs data from accelerometers and/or gyroscopes and sends that data via a wireless communication channel to a processing unit of the service computing device. The processing simultaneously records a video feed from a service camera device communicatively coupled to the service computing device. In other examples, the service computing device comprises the service camera device. In an example, the processing unit uses a machine learning model to identify similarities between gyroscopic and accelerometer data and visual data from the video reed received from the service camera device. In an example, the machine learning model identifies similarities between gyroscopic and accelerometer data and visual data from the video feed that corresponds to the same time period as the received gyroscopic and accelerometer data. In this example, the time period may be determined based on time stamp data associated with the received video feed data and the received gyroscopic and accelerometer data for each user computing device. For example, if a user were to pull his or her user computing device out of his or her pocket at a time period A, the processing unit would identify a signature both in the video feed as well as a corresponding signature from the received movement data comprising the gyroscopic and the accelerometer data during the same time period A. The processing unit would associate the changes in the movement data with changes in the video feed data during the time period and would associate a user computing device identifier with a service request area in the video feed for the time period. In an example, the time period comprises a time period that terminates at the current time. In an example, the service request area corresponds to a location in front of the service computing device. The processing unit would identify the user based on the user computing device identifier or receive, from the account management system, an identity of the user in response to transmitting a request for the identity of the user to the account management system along with the user computing de % ice identifier in the service request area.

For example, the machine learning system is structured as follows: received gyroscopic data and accelerometer data for each user computing device at the location is entered into a Long Short Term Memory ("LSTM") Model and a Deep Neural Network ("DNN") classifier is used to compare data from the video feed to the gyroscopic data and accelerometer data to detect users within the video feed. In an example, the DNN classifier is able to detect potential users within the video feed based on object recognition. For example, the DNN classifier executes a person detection algorithm on the service computing device to determine where each person in each frame of the video feed is located In an example, the DNN Classifier determines whether a region of the video feed that corresponds to a potential user is associated with a particular user computing device represented by the received user computing device movement data. In an example, the LSTM Model would be running on the service application on each user computing device at the service provider system location to generate a serializable encoding of gyroscopic signatures and accelerometer signatures that the DNN Classifier can compare with the visual data for each detected person in the video feed to determine a similarity score. In an example, if the similarity score for a particular user computing device identifier is greater than a predetermined threshold, the DNN classifier determines that the user computing device identifier corresponds to the detected person in the video feed.

In other examples, instead of determining the user computing device identifier that corresponds to the detected person in the video feed based on a similarity score being greater than a predetermined threshold, the DNN classifier uses a tiered threshold matching system In an example tiered threshold matching system, the DNN determines a strong match and a weak match for each detected person in the video feed. The example strong match comprises a higher threshold similarity score than the example weak match so as to maximize precision. The example weak match comprises a threshold similarity score low enough so that an actual present match would be a weak match. In an example, the DNN classifier generates strong and weak matches for all detected objects detected to be persons in the video feed and tracks a unique strong match for a detected object or, if a strong match is not present, a unique weak match for the detected object for all frames of the video feed. Once all detected objects resembling potential persons are tracked, the DNN classifier determines if multiple users are determined to match a single tracked object in any frame of the video feed. Any frames of the video feed for the single tracked object for which the tracked object is assigned to more than one user computing device are excluded from consideration when determining movement of the object in the video feed. In an example, the LSTM Model would be running on the service application on each user computing device at the service provider system location to generate a serializable encoding of gyroscopic signatures and accelerometer signatures that the DNN Classifier can compare with the visual data for each tracked object in the video feed, excluding any frames of the video feed for which the tracked object was assigned to multiple user computing devices, to determine a similarity score. In an example, if the similarity score for a particular user computing device identifier is greater than a predetermined threshold, the DNN classifier determines that the user computing device identifier corresponds to the detected person in the video feed.

The user approaches a service computing device. The service computing device operator totals items of the user for purchase. The service computing device operator asks the user to select a processing option. The user directs the service computing device operator to initiate a service request via the service application. The service computing device operator selects an option on the service computing device to initiate a service request using the service application. The service computing device identifies the user at the service computing device that is initiating the service request. For example, the service computing device identifies a user within the service request area associated with the service computing device captured by the video feed based on movement data and/or facial recognition. The service computing device transmits a request for account information and an identity of the identified user within the service request area of the video feed to the account management system via the network. The account management system receives the request for account information and the identity of the identified user within the service request area of the video feed. In other examples, the service computing device already comprises account information of the identified user.

The service computing device displays accounts of the identified user. The service computing device operator selects a user account for the service request and confirms the service request with permission of the user. The service computing device transmits service request details to the account management system. For example, the service request details comprise a total amount, a selected user account for use in the service request, an account of the service provider for use in the service request, and other useful or relevant information. The account management system transmits a service request authorization request to an issuer system. For example, the issuer system is associated with the user account selected for use in the service request. The issuer system approves the service request authorization request and transmits a service request authorization approval to the account management system. The account management system transmits a service request receipt to the service computing device.

By using and relying on the methods and systems described herein, the account management system, the service camera device, the service beacon device, the user computing device, and the service computing device enable the user to conduct a service request with the service provider system without the user having to interact with the user computing device or produce identity documents or physical account cards, as required in some current technology. As such, the systems and methods described herein may reduce the inputs required by the user via the user computing device and the inputs required by the service computing device operator to identify the user. Further, by using and relying on the methods and systems described herein, the account management system, the service camera device, the service beacon device, the user computing device, and the service computing device enable the user to conduct a service request with the service provider system without the service computing device having to rely entirely on facial recognition to recognize users. By correlating movement data received from a user computing devices to an object in a video feed identified as users, a service computing device may identify a user in cases where the video feed captured images of the user over a period of time but was unable to capture a facial image of the user that would enable identification via facial recognition.

Example System Architecture

Turning now to the drawings, in which like numerals indicate like (but not necessarily identical) elements throughout the figures, examples are described in detail.

FIG. 1 is a block diagram depicting a system 100 for conducting a hands-free transaction with facial recognition and movement recognition of users 101, in accordance with certain examples. As depicted in FIG. 1, the system 100 includes network computing devices 110, 130, 140, and 150 that are configured to communicate with one another via one or more networks 120. In some embodiments, a user associated with a device must install an application and/or make a feature selection to obtain the benefits of the techniques described herein.

In examples, the network 140 can include a local area network ("LAN"), a wide area network ("WAN"), an intranet, an Internet, storage area network ("SAN"), personal area network ("PAN"), a metropolitan area network ("MAN"), a wireless local area network ("WLAN"), a virtual private network ("VPN"), a cellular or other mobile communication network, Bluetooth, Bluetooth low energy, NFC, or any combination thereof or any other appropriate architecture or system that facilitates the communication of signals, data, and/or messages. Throughout the discussion of examples, it should be understood that the terms "data" and "information" are used interchangeably herein to refer to text, images, audio, video, or any other form of information that can exist in a computer-based environment.

Each network computing device 110, 130, 140, and 150 includes a device having a communication module capable of transmitting and receiving data over the network 140. For example, each network computing device 110, 130, 140, and 150 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example depicted in FIG. 1, the network computing devices 110, 130, 140, 150, and 160 are operated by users 101, service beacon device 120 operators, service provider point of sale ("POS") device 130 operators, service camera device 135 operators and account management system 150, respectively.

An example user computing device 110 comprises a user interface 111, a service application 112, an antenna 113, a Wi-Fi controller 114, a data storage unit 115, a camera component 116, a web browser 117a, a communication application 117b, an accelerometer 118, and a global positioning system ("GPS") module 119.

In an example, the user interface 111 enables the user 101 to interact with the service application 112 and/or web browser 117a. For example, the user interface 111 may be a touch screen, a voice-based interface, or any other interface that allows the user 101 to provide input and receive output from an application or module on the user computing device 110. In an example, the user 101 interacts via the user interface 111 with the service application 112 and/or web browser 117a to configure user 101 accounts on the account management system 150. In another example, the user 101 interacts via the user interface 111 with the service application 112 and/or the web browser 117a to enable hands-free payments, if needed.

In an example, the service application 112 is a program, function, routine, applet, or similar entity that exists on and performs its operations on the user computing device 110. In certain examples, the user 101 must install the service application 112 and/or make a feature selection on the user computing device 110 to obtain the benefits of the techniques described herein. In an example, the user 101 may access the service application 112 on the user computing device 110 via the user interface 111. In an example, the service application 112 may be associated with the account management system 150. In another example, the service application 112 may be associated with a service provider system associated with the service beacon device 120, the service computing device 130 and the service camera device 135. In yet another example, two service applications 112 exist, one associated with the service provider system and another associated with the account management system 150.

In an example, the antenna 113 is a means of communication between the user computing device 110 and a service beacon device 120. In an example, a Wi-Fi controller 114 outputs through the antenna 113 a radio signal, or listens for radio signals from the service beacon device 120. In another example a Bluetooth controller or a near field communication ("NFC") controller is used In an example, the Wi-Fi controller 114 outputs through the antenna 113 a radio signal, or listens for radio signals from the service beacon device 120.

In an example, the Wi-Fi controller 114 is capable of sending and receiving data, performing authentication and ciphering functions, and directing how the user computing device 110 will listen for transmissions from the service beacon device 120 or configuring the user computing device 110 into various power-save modes according to Wi-Fi-specified procedures. In another example, the user computing device 110 comprises a Bluetooth controller or an NFC controller capable of performing similar functions. An example Wi-Fi controller 114 communicates with the service application 112 and is capable of sending and receiving data over a wireless, Wi-Fi communication channel. In another example, a Bluetooth controller 112 or NFC controller 112 performs similar functions as the Wi-Fi controller 114 using Bluetooth or NFC protocols. In an example, the Wi-Fi controller 114 activates the antenna 113 to create a wireless communication channel between the user computing device 110 and the service beacon device 120. The user computing device 110 communicates with the service beacon device 120 via the antenna 113. In an example, when the user computing device 110 has been activated, the Wi-Fi controller 114 polls through the antenna 113 a radio signal, or listens for radio signals from the service beacon device 120.

In an example, the data storage unit 115 comprises a local or remote data storage structure accessible to the user computing device 110 suitable for storing information. In an example, the data storage unit 115 stores encrypted information, such as HTML5 local storage.

In an example, the camera component 116 may be any module or function of the user computing device 110 that obtains a digital image. The camera component 116 may be resident on the user computing device 110 or in any manner logically connected to the user computing device 110. For example, the camera component 116 may be connected to the user computing device 110 via the network 140. The camera component 116 may be capable of obtaining individual images or a video scan. Any other suitable image capturing device may be represented by the camera component 116.

In an example, the user 101 can use a communication application 117b, such as a web browser 117a application or a stand-alone application, to view, download, upload, or otherwise access documents or web pages via a distributed network 140.

In an example, the web browser 117a can enable the user 101 to interact with web pages using the user computing device 110. In an example, the user 101 may access the user's 101 account maintained by the account management system 150 via the web browser 117a. In another example, the user 101 may access the service provider system website via the web browser 117a In certain examples described herein, one or more functions performed by the service application 112 may also be performed by a web browser 117a application associated with the account management system 150.

In an example, the communication application 117b can interact with web servers or other computing devices connected to the network 140, including the user computing device 110 and a web server of a service provider system.

In certain examples, one or more functions herein described as performed by the service application 112 may also be performed by a web browser 117a application, for example, a web browser 117a application associated with a service provider system website or associated with the account management system 150. In certain examples, one or more functions herein described as performed by the service application 112 may also be performed by the user computing device 110 operating system. In certain examples, one or more functions herein described as performed via the web browser 117a may also be performed via the service application 112.

In an example, the accelerometer 118 is able to detect a magnitude and direction of acceleration or magnitude and direction of velocity of the user computing device 110. In an example, the accelerometer 118 communicates with the service application 112 or the service application 112 is otherwise able to receive data from the accelerometer 118. In an example, the accelerometer comprises a gyroscope or the user computing device 110 comprises both an accelerometer 118 and a gyroscope. In an example, the gyroscope is able to detect an orientation of the user computing device 110, a rotation rate of the user computing device 110, or other data that describes or indicates an orientation, position, or a movement of the user computing device 110. In an example, the gyroscope communicates with the service application 112 or the service application 112 is otherwise able to receive data from the gyroscope.

In an example, the GPS module 119 is able to detect a current location of the user computing device 110 comprising a longitude and a latitude or other descriptive data describing a location of the user computing device 110. In an example, the GPS module 119 communicates with the service application 112 or the service application 112 is otherwise able to receive data from the GPS module 119.

An example service beacon device 120 comprises an antenna 121 and a Wi-Fi controller 122. In an example, a service provider system location comprises one or more service beacon devices 120 installed at the service provider system location. In an example, each installed service beacon device 120 is associated by an account management system 150 with a particular service computing device 140 installed at the service provider location. For example, the account management system 150 may comprise a database that correlates service beacon device 120 identifiers with service computing device 140 identifiers for associated service camera devices 140. For example, a service computing device 140 identifier may comprise hardware identifier specific to the device such as a serial number or a MAC ID associated with the service computing device 140. In another example, a service beacon device 120 identifier may comprise a hardware identifier specific to the beacon device or an identifier generated by the account management system 130 and stored in the service beacon device 120. An example service beacon device 120 is programmed to broadcast, emit, or otherwise transmit a particular service beacon device 120 identifier over a wireless network 140 to any user computing devices 110 within a threshold distance required to maintain the wireless network 140. For example, the wireless network may comprise a Wi-Fi network 140, a Bluetooth network 140, an NFC network 140, or any other appropriate wireless network 140.

In an example, the antenna 121 is a means of communication between the user computing device 110 and a service beacon device 120. In an example, a Wi-Fi controller 122 outputs through the antenna 121 a radio signal, or listens for radio signals from the user computing device 110. In another example a Bluetooth controller or a near field communication ("NFC") controller is used. In an example, the Wi-Fi controller 122 outputs through the antenna 121 a radio signal, or listens for radio signals from the payment card device 120.

In an example, the Wi-Fi controller 122 is capable of sending and receiving data, performing authentication and ciphering functions, and directing how service beacon device 120 will listen for transmissions from the user computing device 110 or configuring the service beacon device 120 into various power-save modes according to Wi-Fi-specified procedures. In another example, the service beacon device 120 comprises a Bluetooth controller or an NFC controller capable of performing similar functions. An example Wi-Fi controller 122 communicates with the service application 112 and is capable of sending and receiving data over a wireless, Wi-Fi communication channel. In another example, a Bluetooth controller 122 or NFC controller 122 performs similar functions as the Wi-Fi controller 122 using Bluetooth or NFC protocols. In an example, the Wi-Fi controller 122 activates the antenna 121 to create a wireless communication channel between the user computing device 110 and the service beacon device 120. The service beacon device 120 communicates with the user computing device 110 via the antenna 121. In an example, when the service beacon device 120 has been activated, the Wi-Fi controller 122 polls through the antenna 121 a radio signal, or listens for radio signals from the user computing device 110.

An example service computing device 130 comprises a user interface 131, a service application 132, a communication application 133, a data storage unit 134, and a service camera device 135, which comprises a camera component 136, a processor 137, and a data storage unit 139.

In an example, the user interface 131 enables the service provider POS device operator 102 to interact with the service computing device 130. For example, the user interface 131 may be a touch screen, a voice-based interface, or any other interface that allows the service provider POS device operator 102 to provide input and receive output from an application or module on the service computing device 130. In an example, the service provider POS device operator 102 interacts via the user interface 131 with the service application 132.

In an example, the service application 132 is a program, function, routine, applet, or similar entity that exists on and performs its operations on the service computing device 130. In certain examples, the service provider point of sale ("POS") device operator 102 or other service provider system operator must install the service application 132 and/or make a feature selection on the service computing device 130 to obtain the benefits of the techniques described herein. In an example, the service provider POS device operator 102 may access the service application 132 on the service computing device 130 via the user interface 131. In an example, the service application 132 may be associated with the account management system 150. In another example, the service application 132 may be associated with a service provider system associated with the service beacon device 120 and the service camera device 135. In yet another example, two service applications 133 exist, one associated with the service provider system and another associated with the account management system 150.

In an example, the communication application 133, such as a web browser application or a stand-alone application, enables an operator of the service computing device 130 to view, download, upload, or otherwise access documents or web pages via a distributed network 140. For example, the communication application 133 may enable communication over the network 140 with the account management system 150. In an example, the communication application 133 enables the service computing device 130 and/or service camera device 135 to communicate with a server of the account management system 150.

In an example, the data storage unit 134 comprises a local or remote data storage structure accessible to the service computing device 130 suitable for storing information. In an example, the data storage unit 134 stores encrypted information, such as HTML5 local storage.

An example service camera device 135 comprises a camera component 136, a processor 137, and a data storage unit 139.

In an example, the camera component 136 may be any module or function of the service camera device 135 that captures a video input or captures a digital image of an external environment of the service camera device 135. The camera component 136 may be resident on the service camera device 135 or in any manner logically connected to the service camera device 135. For example, the camera component 136 may be connected to the service camera device 135 via the network 140. The camera component 136 may be capable of obtaining individual images or a video scan. Any other suitable image capturing device may be represented by the camera component 136.

In an example, the processor 137 performs one or more functions described herein as being performed by the service camera device 135.

In an example, the data storage unit 139 comprises a local or remote data storage structure accessible to the service camera device 135 suitable for storing information. In an example, the data storage unit 139 stores encrypted information, such as HTML5 local storage.

An example issuer system (not depicted) approves or denies a payment authorization received from the account management system 150. For example, a service request may comprise a request to process a payment transaction. In an example, the issuer system communicates with the account management system 150 over the network 140. In an example, the issuer system communicates with an acquirer system to approve a credit authorization and to make payment to the account management system 150 and/or service provider system. For example, the acquirer system is a third party account management company.

An example account management system 150 comprises an account management module 151, a movement recognition module 152, a facial recognition module 153, a service processing module 154, a data storage unit 155, a server 157, and a website 159.

In an example, the account management module 151 manages one or more user 101 accounts. In an example, a user 101 account may comprise a digital wallet account, an email account, a social networking account, or any other appropriate account associated with the account management system 150. In an example, the account management system 161 communicates with a service application 112 operating on a user computing device 110 associated with a user 101 having a user 101 account with the account management system 150. In an example, the user 101 enters payment account information into the user 101 account via the service application 112 and the account management module 151 receives the payment account information over the network 140 and associates the received payment account information with the user 101 account.

In an example, the movement recognition module 152 receives the movement data from each user computing device 110 at the service provider system location via the network 140. In this example, the movement recognition module 152 receives a video feed from the service computing device 130 and compares the received video feed with the movement data of user computing devices 110 to identify users in the video feed. In this example, the movement recognition module 152 transmits identities of the users identified in the video feed to the service computing device 130. In another example, the movement recognition module 152 transmits the received movement data to the service computing device 130 at the service provider location. In this other example, the service computing device 130 compares the received video feed with movement data of user computing devices 110 received from the movement recognition module 152 to identify users in the video feed. In an example, the service computing device 130 defines a location of the area captured by the video feed associated with a service request area and determines an identity of the user within the service request area. In an example, the video feed comprises multiple service request areas, each service request area associated with a particular service computing device 130. In this example, the service computing device 130 or movement recognition module 152 an identity of a particular user within each service request area associated with each particular corresponding service computing device 130.

In an example, the facial recognition module 153 receives a facial image of a user 101 associated with a user 101 account submitted by the user 101 via the user computing device 110 over the network 140. For example, the user 101 submits the facial image at the time the user 101 establishes the user 101 account with the account management system 150. In an example, the facial recognition module 153 generates a facial template based on a received facial image.

In an example, the service processing module 154 receives transaction details from a service computing device 130 and a request to initiate a transaction. Example transaction details comprise service provider system account information, a total amount of the transaction, and a user 101 selection of a user 101 payment account associated with the user's 101 account with the account management system 150. For example, the user's 101 account is a digital wallet account comprising one or more payment account information corresponding to one or more respective payment accounts of the user 101 in an example, the service processing module 154 extracts payment account information from the user 101 account corresponding to the user 101 selection of the user 101 payment account received in the transaction details from the service computing device 130. In an example, the service processing module 154 transmits a payment authorization request to an issuer system or other appropriate financial institution associated with the payment account selected by the user 101 for use in the transaction. An example payment authorization request may comprise service provider system payment account information, user 101 payment account information, and a total amount of the transaction. In an example, after the issuer system processes the payment authorization request, the service processing module 154 receives an approval or denial of the payment authorization request from the issuer system over the network 140. In an example, the service processing module 154 transmits a receipt to the service computing device 130 and/or the user computing device 110 comprising a summary of the transaction.

In an example, the data storage unit 155 comprises a local or remote data storage structure accessible to the account management system 150 suitable for storing information. In an example, the data storage unit 155 stores encrypted information, such as HTML5 local storage.

In an example, the server 157 provides content accessible by the user 101 through the web browser 117a and/or service application 112 on the user computing device 110, including but not limited to html documents, images, style sheets, and scripts. In an example embodiment, the server 157 supports the account management system website 159.

In an example embodiment, the website 159 provides the service application 112 for download by the user computing device 110 and the service application 132 for download by the service computing device 130. In an example embodiment, the account management system website 159 is accessed by the user 101 via the web browser 117a. In another example embodiment, the user 101 accesses the website 159 via a service application 112 resident on the user computing device 110.

It will be appreciated that the network connections shown are example and other means of establishing a communications link between the computers and devices can be used. Moreover, those having ordinary skill in the art having the benefit of the present disclosure will appreciate that the user computing device 110, the service beacon device 120, the service computing device 130, the service camera device 135, the issuer system, and the account management system 150 illustrated in FIG. 1 can have any of several other suitable computer system configurations. For example, a user computing device 110 embodied as a mobile phone or handheld computer may or may not include all the components described above.

Figure 13:
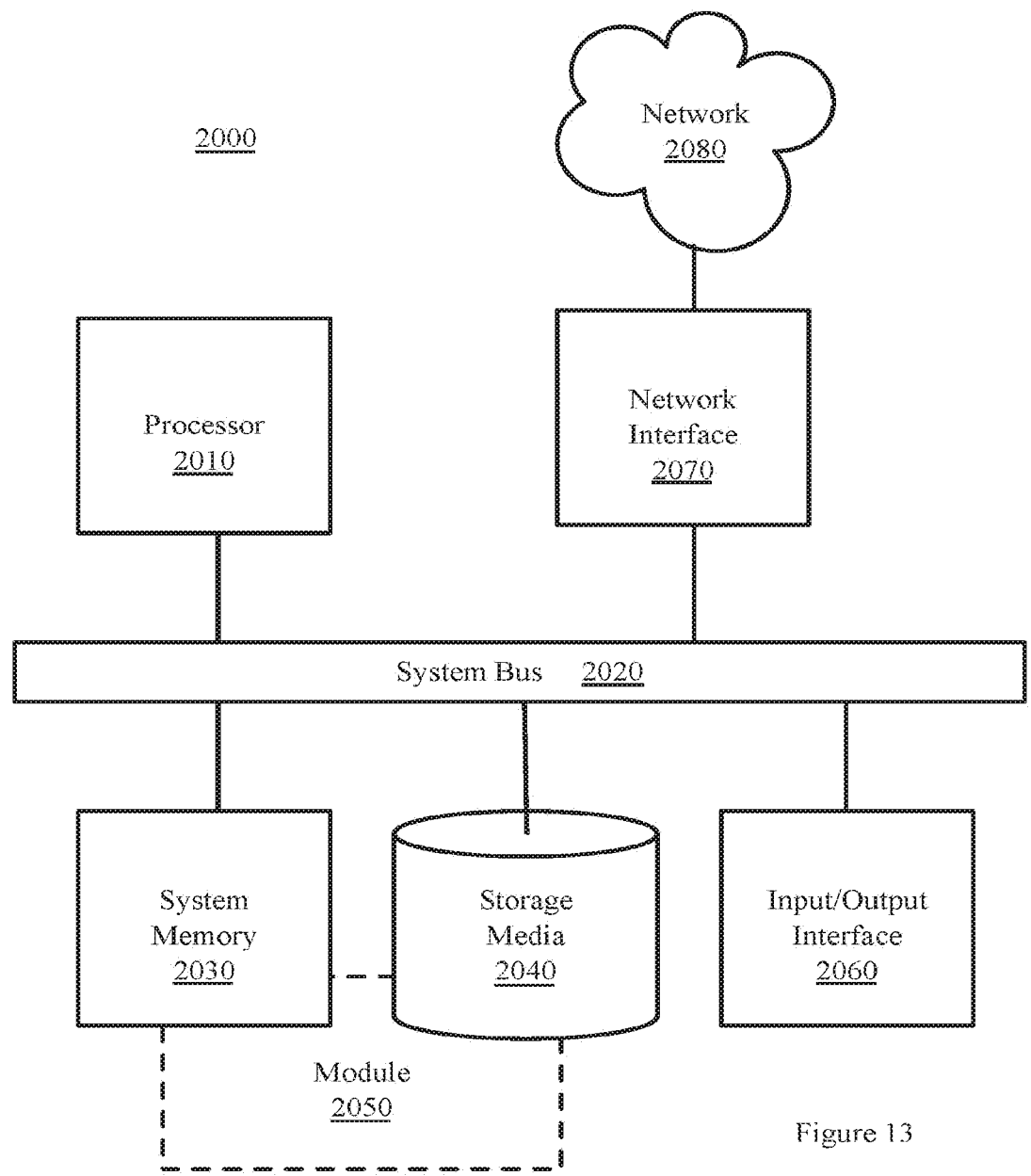
FIG. 13 is a block diagram depicting a computing machine and module, in accordance with certain examples.

In examples, the network computing devices and any other computing machines associated with the technology presented herein may be any type of computing machine such as, but not limited to, those discussed in more detail with respect to FIG. 13. Furthermore, any modules associated with any of these computing machines, such as modules described herein or any other modules (scripts, web content, software, firmware, or hardware) associated with the technology presented herein may by any of the modules discussed in more detail with respect to FIG. 13. The computing machines discussed herein may communicate with one another as well as other computer machines or communication systems over one or more networks, such as network 140. The network 140 may include any type of data or communications network, including any of the network technology discussed with respect to FIG. 13.

Example Processes

The example methods illustrated in FIGS. 2-12 are described hereinafter with respect to the components of the example operating environment 100. The example methods of FIGS. 2-12 may also be performed with other systems and in other environments.

Figure 2:
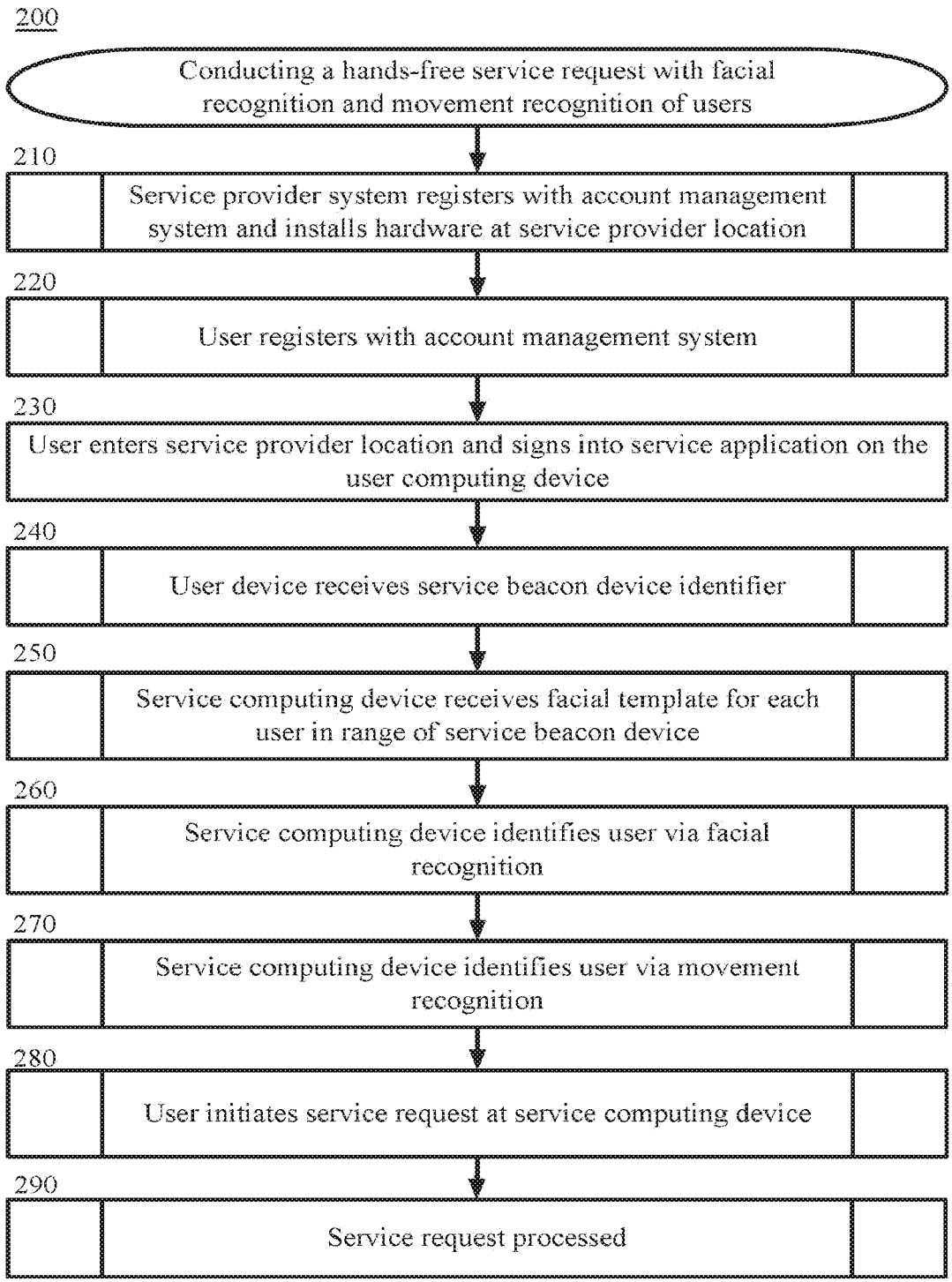
FIG. 2 is a block flow diagram depicting a method for conducting a hands-free service request with facial recognition and movement recognition of users, in accordance with certain examples.

FIG. 2 is a block diagram depicting a method 200 for conducting a hands-free transaction with facial recognition and movement recognition of users 101, in accordance with certain examples. The method 200 is described with reference to the components illustrated in FIG. 1.

In block 210, the service provider system registers with the account management system 150 and installs hardware in a service provider location. The method for registering, by a service provider system, with a account management system 150 and installing hardware at a service provider system location is described in more detail hereinafter with reference to the method described in FIG. 3.

Figure 3:
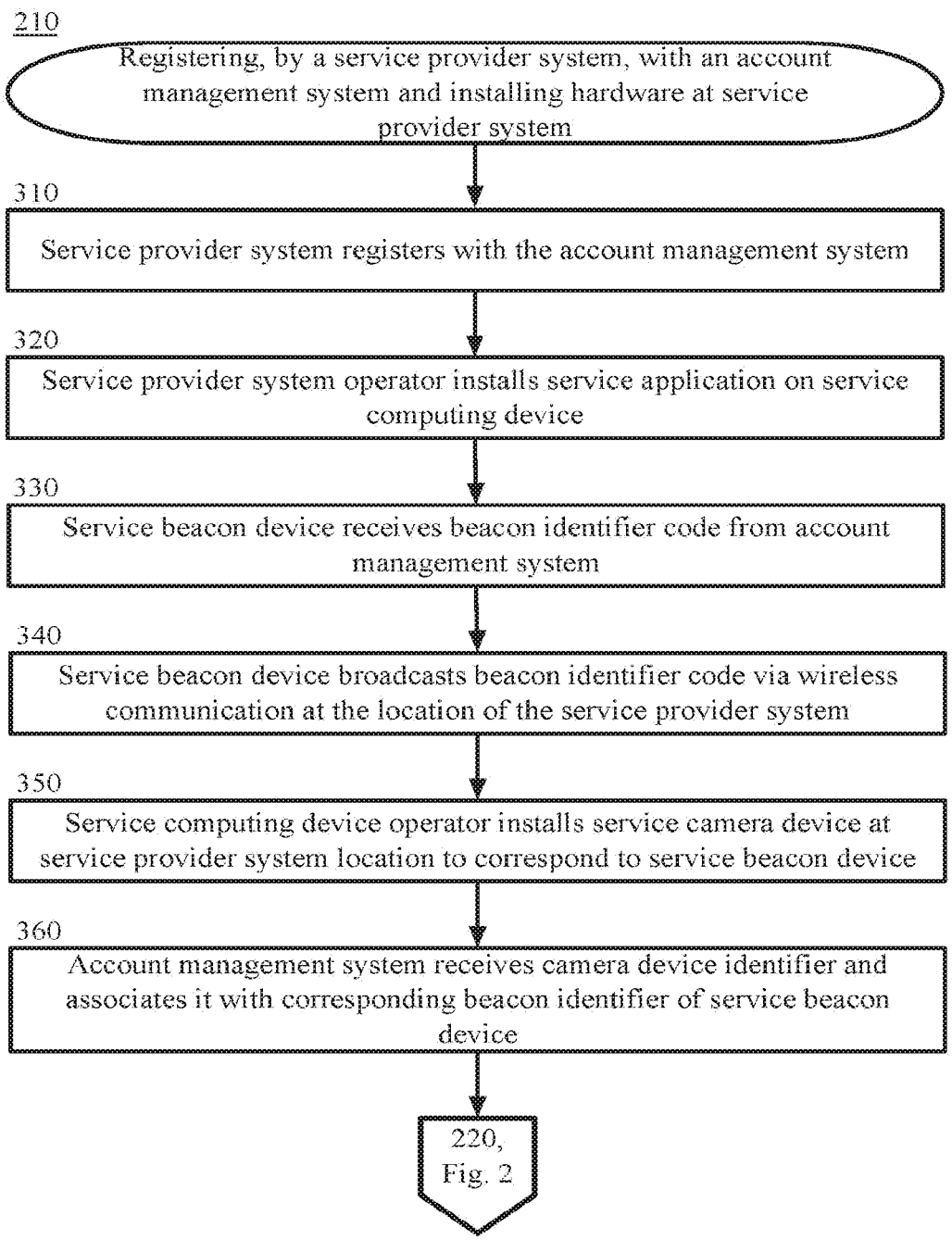
FIG. 3 is a block flow diagram depicting a method for registering, by a service provider system, with an account management system and installing hardware at a service provider system location, in accordance with certain examples.

FIG. 3 is a block diagram depicting a method 210 for registering, by a service provider system, with an account management system 150 and installing hardware at a service provider system location, in accordance with certain examples. The method 210 is described with reference to the components illustrated in FIG. 1.

In the examples described herein, the service provider system does not need to install hardware at the example service provider system location in any particular order. The method 210 describes one example method of installing hardware at the service provider location. However, the service provider system or other system installing the service provider hardware does not need to install the service computing device 130, the service camera device 135, or the service beacon device 120 in the order described herein. Further, in certain examples, the service computing device 130 the service camera device 135 and, in certain examples, the service computing device 130 comprises the service beacon device 120. In yet other examples, the service computing device 130 comprises the service camera device 135 and the service beacon device 120.

In block 310, a service provider system registers with the account management system 150. In an example, an agent of the service provider system accesses a account management system 150 website 159 and registers for a service provider account with the account management system 150 via the website 159. In an example, the service provider system adds account information associated with a service provider account to the service provider account managed by the account management system 150. For example, the account information comprises payment account information associated with a service provider system payment account. In an example, the service provider system comprises one or more service provider system locations. For example, the service provider system may comprise one or more physical store locations. An example service provider location comprises one or more service computing devices 130. In an example, one or more service system operators 102 operate the one or more service computing devices 130 at the service provider system location.

In block 320, a service provider system operator 102 installs the service application 132 on the service computing device 130. In another example, the service provider system operator purchases a service computing device 130 from the account management system 150 with the service application 132 pre-installed on the service computing device 130. In an example, the service computing device 130 is able to communicate with the account management system 150 over a network 140. In an example, the service computing device 130 communicates with the account management system 150 via the service application 132. For example, the service computing device 130 may be able to transmit transaction details to the account management system 150 via the service application 132 over the network 140 to enable the account management system 150 to process a transaction. In another example, the service computing device 130 may be able to receive a receipt from the account management system 150 that notifies a service provider POS device operator 102 as to whether a transaction was successful or not.

In block 330, the service beacon device 120 receives a beacon identifier code from the account management system 150. In an example, the service provider system receives a beacon identifier from the account management system 150 and installs or otherwise saves the beacon identifier on the service beacon device 120. In an example, a service provider system operator installs the service beacon device 120 in proximity to a service computing device 130. In an example, the service provider system operator installs a plurality of service beacon devices 120, each service beacon device 120 in proximity to one or more associated service computing devices 130. In an example, the service beacon device 120 is able to broadcast a service beacon device 120 identifier over a wireless medium, wherein one or more user computing devices 110 located within a threshold proximity to the service beacon device 120 are able to receive the service beacon device 120 identifier over the wireless medium. In another example, the service beacon device 120 is able to establish a local network 140 connection to one or more user computing devices 110 located within a threshold proximity to the service beacon device 120 and the service beacon device 120 transmits the service beacon device 120 identifier to the one or more user computing devices 110 over the established local network 140 connection. For example, the threshold proximity depends on the network 140 communication protocol utilized by the service beacon device 120.

In block 340, the service beacon device 120 broadcasts the beacon identifier code via wireless communication at the location of the service provider system. For example, the service beacon device 120 may broadcast, emit, or otherwise transmit data comprising the beacon identifier via Wi-Fi, Bluetooth, Bluetooth low energy ("BLE"), near field communication ("NFC"), or other appropriate communication protocol to one or more user computing devices 110 located at the service provider system location within a threshold proximity to the service beacon device 120. In some examples, the service beacon device 120, at a time before transmitting the service beacon device 120 identifier, is operable to establish a network 140 connection between the service beacon device 120 and one or more user computing devices 110 located at the service provider system location within a threshold proximity to the service beacon device 120.

In block 350, a service provider system operator 102 installs the service camera device 135 at the service provider system location to correspond to the service beacon device 120. In an example, both a service camera device 135 and a service beacon device 120 are installed in proximity to a particular service computing device 130. In another example, a service camera device 135 and a service beacon device 120 are installed in proximity to two or more particular service computing devices 130. In an example, the service camera device 135 is oriented to be able to capture video and/or images of a face of a user 101 standing in front of one or more service computing devices 130 during the process of checkout. In an example, the service provider system installs a service camera device 135 that is oriented to capture video and/or images of the face of a user standing in front of a particular service computing device 130. In another example, the service provider system installs a service camera device 135 that is oriented to capture video and/or images of the faces of one or more users 101 standing within a proximity of a particular plurality of service computing devices 130 within a range of a field of vision of the camera component 136 of the service camera device 135.

In block 360, the account management system 150 receives a service camera device 135 identifier and associates it with the corresponding beacon identifier code of the service beacon device 120. In an example, the service provider system and/or the account management system 150 configures the service camera device 135 so that the service camera device 135 is able to communicate with the account management system 150 over the network 140. An example service camera device 135 identifier comprises a hardware identifier, a MAC address, or other useful or relevant identifier associated with the service camera device 135. In an example, the account management system 150 comprises a database comprising service camera device 135 identifiers, service computing device 130 identifiers, and associated beacon identifiers for service beacon device 120 identifiers for a particular service provider system location. In an example, the service camera device 135 transmits the service beacon device 120 identifier in addition to the service camera device 135 identifier to the account management system 150. In an example, the service camera device 135, during the setup and installation process, may receive the service beacon device 120 identifier over an appropriate wireless communication channel from the service beacon device 120. In another example, the service camera device 135, during the setup and installation process, may establish a network 140 connection with the service beacon device 120 and receive the service beacon device 120 identifier over the network 140. In another example, the account management system 150 receives the service camera device 135 identifier, extracts one or more service beacon device 120 identifiers from the database, and associates the service camera device 135 identifier with one or more of the one or more extracted service beacon device 120 identifiers. In yet another example, the service provider system operator installs the one or more service beacon devices 120 after installing the one or more service camera devices 140. In this example, the account management system 150 generates a service beacon device identifier to associate with a service camera device 135 identifier and transmits the generated service beacon device identifier to the service provider system. In this example, the service provider system operator manually configures the service beacon device 120 to broadcast, emit, or otherwise transmit the service beacon device identifier assigned by the account management system 150 over a network 140.

In certain examples, one or both of the service camera device 135 and the service beacon device 120 are components of the service computing device 130 or are wirelessly or physically connected to the service computing device 130 and controlled by one or more processors of the service computing device 130. In certain examples, certain functions described herein as performed by the service camera device 135 and/or the service beacon device 120 may also be performed by the service computing device 130.

From block 360, the method 210 proceeds to block 220 of FIG. 2.

Returning to FIG. 2, in block 220, the user 101 registers with the account management system 150. The method for registering, by a user 101, for an account with a account management system 150 is described in more detail hereinafter with reference to the method 220 described in FIG. 4.

Figure 4:
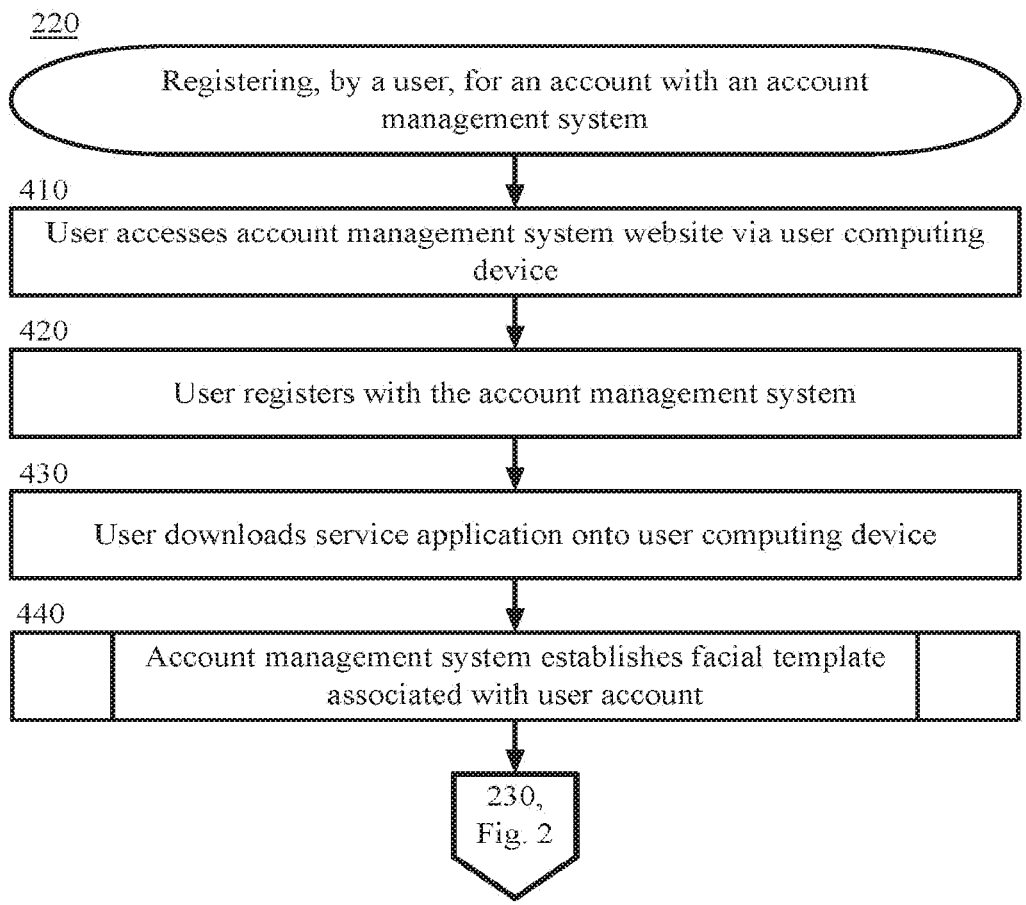
FIG. 4 is a block flow diagram depicting a method for registering, by a user, for an account with an account management system, in accordance with certain examples.

FIG. 4 is a block diagram depicting a method 220 for registering, by a user 101, for an account with an account management system 150, in accordance with certain examples. The method 220 is described with reference to the components illustrated in FIG. 1.

In block 410, the user 101 accesses the account management system website 159. For example, the user 101 accesses the account management system 150 via the web browser 117a of the user computing device 110. In another example, the user 101 may otherwise contact the account management system 150 to register for a user 101 account.

In block 420, the user 101 registers with the account management system 150. The user 101 may obtain a user account number, receive the appropriate applications and software to install on the user computing device 110, request authorization to participate in hands-free account management, or perform any action required by the account management system 150. The user 101 may utilize the functions of the user computing device 110, such as the user interface 111 and the web browser 117a, to register and configure a user 101 account. In an example, the user 101 may enter payment account information associated with one or more user 101 accounts, for example, one or more credit accounts, one or more bank accounts, one or more stored value accounts, and/or other appropriate accounts into the user 101 account maintained by the account management system 150.

In block 430, the user 101 downloads the service application 112 onto the user computing device 110. In an example, the service application 112 operating on the user computing device 110 is able to communicate with the account management system 150 over the network 140. In an example, the user 101 may configure user 101 account settings or add, delete, or edit payment account information via the service application 112. In an example, the user 101 may select an option to enable or disable the permission of the account management system 150 to process hands free transactions. For example, a hands free transaction comprises a transaction wherein the user 101 does not need to interact with the user computing device 110 or requires minimal user 101 interaction with the user computing device 110 to initiate a transaction with the service provider system.

In block 440, the account management system 150 establishes a facial template associated with the user 101 account. The method for establishing a facial template associated with a user 101 account is described in more detail hereinafter with reference to the method 440 described in FIG. 5.

Figure 5:
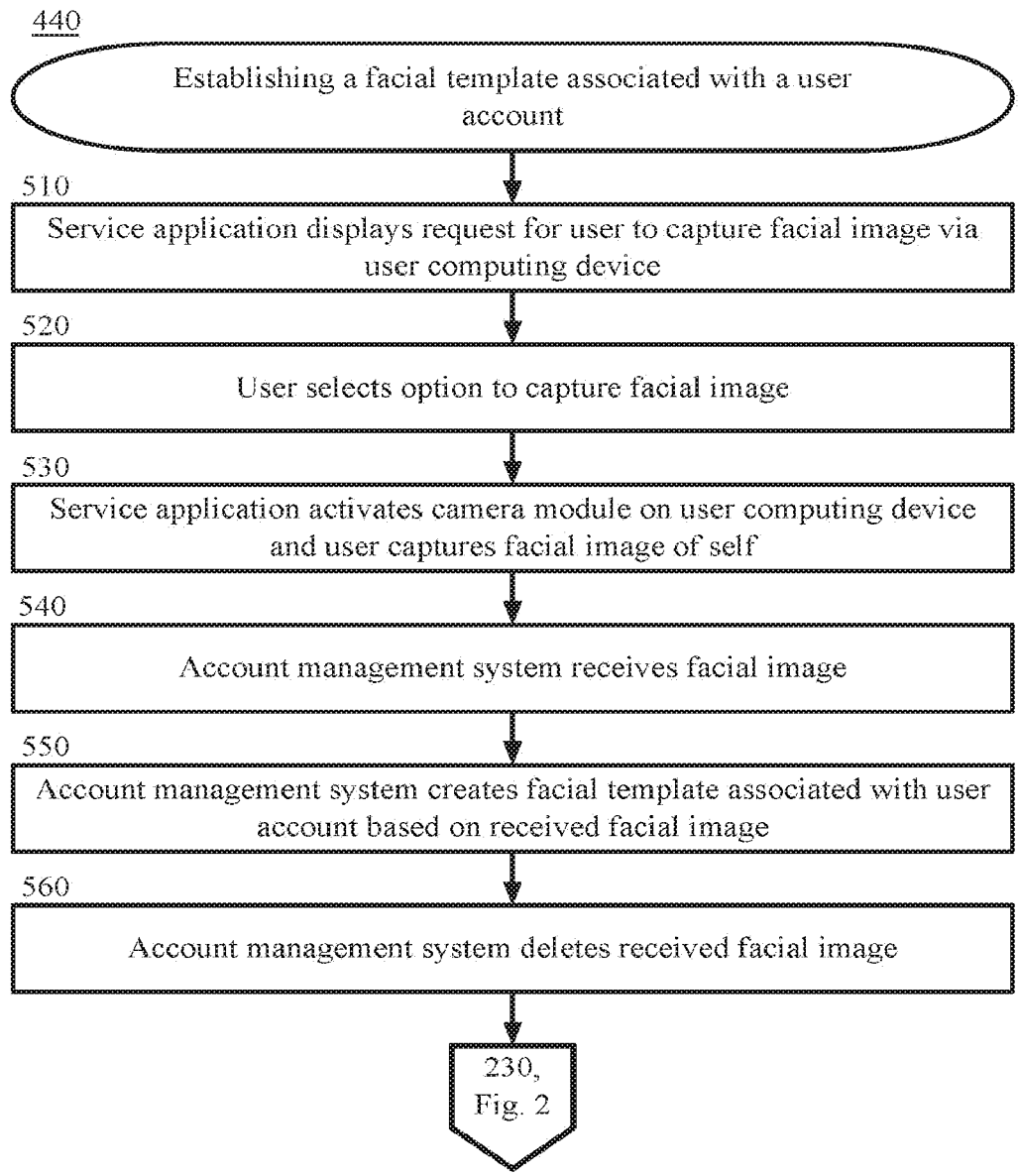
FIG. 5 is a block flow diagram depicting a method for establishing a facial template associated with a user account, in accordance with certain examples.

FIG. 5 is a block diagram depicting a method 440 for establishing a facial template associated with a user 101 account, in accordance with certain examples. The method 440 is described with reference to the components illustrated in FIG. 1.

In block 510, the service application 112 displays a request for the user 101 to capture a facial image via the user computing device 110. In an example, the service application 112 displays the request via the user interface 111. In an example, the user interface 111 may display a request that reads, "to enable hands free service requests, we need an image of your face. Would you like submit a facial image now?" In this example, the user 101 may select an option to take a current picture or may otherwise select a picture stored on the user computing device 110.

In block 520, the user 101 selects an option to capture a facial image. For example, the user 101 actuates an object on the user interface 111 that reads, "yes, I would like to take a picture now."

In block 530, the service application 112 activates the camera component 116 on the user computing device 110 and the user 101 captures a facial image of himself or of herself. In an example, the user computing device user interface 111 may display a live camera feed of the user 101 to aid the user 101 in aligning the user's 101 face to take the facial image. In an example, the service application 112 may display on the user computing device 110 a box or other perimeter on the user interface 111 within which the user 101 should align his face to take a picture of a required size predetermined by the account management system 150. In an example, the user 101 may actuate an object on the user interface 111 to capture the image. In this example, in response to the user actuating the object on the user interface 111, the camera component 116 receives a command from the service application 112 to capture an image of the user 101. In another example, the camera component 116 receives a command from the service application 112 to capture a plurality of images of the user 101 as the user 101 moves the camera around the user's 101 face. For example, each of the plurality of images of the user 101 may correspond to a particular pose of the user's 101 face. An example facial image may comprise a digital image of the face of a user 101. In an example, the account management system 150 may establish guidelines for users 101 in submitting facial images. For example, the service application 112 may direct the user 101 to remove any hats, head coverings, glasses, or other objects or accessories that may occlude regions of the user's 101 face so that service application 160 may receive a complete depiction of the user's 101 face.

In an example, the user computing device 110 determines if the captured facial image is a valid facial image or an invalid facial image. For example, a valid facial image complies with guidelines predetermined by the account management system 150 and an invalid facial image does not comply with one or more of the guidelines. For example, if the user computing device 110 captures a facial image that comprises incorrect dimensions, if part or all of the user's 101 face is occluded, or if the image is too dark or too bright, the user computing device 110 rejects the invalid facial image and displays a request directing the user 101 to capture a subsequent facial image. In this example, the user 101 captures a subsequent facial image via the user computing device 110, and the user computing device 110 transmits the subsequent facial image to the account management system 150 via the network 140.

In block 540, the account management system 150 receives the facial image. In another example, the account management system 150 receives a plurality of facial images of the user 101. For example, the service application 112 transmits the one or more facial images of the user 101 to the account management system 150 via the network 140. In an example, the account management system 150 associates the received one or more facial images with the user 101 account. For example, the account management system 150 is able to identify the user 101 account to associate with the received one or more images because the user 101 is currently logged in to the service application 112 on the user computing device 110 at the time the one or more facial images are transmitted to the account management system 150. In certain examples, the account management system 150 determines if the received facial image is a valid facial image or an invalid facial image. For example, a valid facial image complies with all guidelines predetermined by the account management system 150 and an invalid facial image does not comply with one or more of the guidelines. For example, if a user 101 submits a facial image that comprises incorrect dimensions, if part or all of the user's 101 face is occluded, or if the image is too dark or too bright, the account management system 150 rejects the invalid facial image and transmits a request to the user computing device 110 directing the user 101 to capture a subsequent facial image to transmit to the account management system 150. In this example, the user computing device 110 receives and displays the request, the user 101 captures a subsequent facial image via the user computing device 110, and the user computing device 110 transmits the subsequent facial image to the account management system 150 via the network 140.

In block 550, the account management system 150 creates a facial template associated with the user 101 account based on the received facial image. In another example, the account management system 150 generates a corresponding facial template for each of a plurality of received facial images associated with the user 101 account. In an example, the facial template is of a predetermined size, for example, a 128-byte facial template. In an example, the account management system 150 generates a facial template comprising a computer code representation of the digital facial image. For example, the facial template may describe key features of the facial image of the user 101, such as shape, color, line, value, space, form, texture, or other useful or relevant feature of the image or of particular regions of the image. In an example, the facial template is generated by processing the facial image through a convolutional neural network. In an example, the account management system 150 stores the generated facial template associated with the user 101 in a data storage unit 155 associated with the account management system 150. For example, the account management system 150 database may comprise a table or other means by which it correlates each user 101 account identifier with an associated facial template of the user 101.

In another example, after the user computing device 110 captures one or more facial images of the user 101, the user computing device 110 generates one or more facial templates corresponding to one or more of the one or more captured facial images of the user 101. In this example, the user computing device 110 transmits the one or more generated facial templates to the account management system 150 over the network 140.

In block 560, the account management system 150 deletes the received facial image. For example, the account management system 150 only uses a facial template comprising a computer code representation of the facial image of the user 101. In another example, the account management system 150 saves the received facial image for future processing. For example, the account management system 150, at a later time, updates a facial template generation algorithm and generates an updated facial template corresponding to the saved facial image.

From block 560, the method 440 proceeds to block 230 in FIG. 2.

Returning to block 230, in FIG. 2, the user 101 enters the service provider system location and signs into the service application 112 on the user computing device 110. In another example the user 101 signs into the service application 112 at a time before entering the service provider system location and enters the service provider location carrying the user computing device 110 signed into the service application 112.

In block 240, the user device receives a service beacon device 120 identifier. The method for receiving, by a user computing device 110, a service beacon device 120 identifier broadcast by a service beacon device 120 is described in more detail hereinafter with reference to the method 240 described in FIG. 6.

Figure 6:
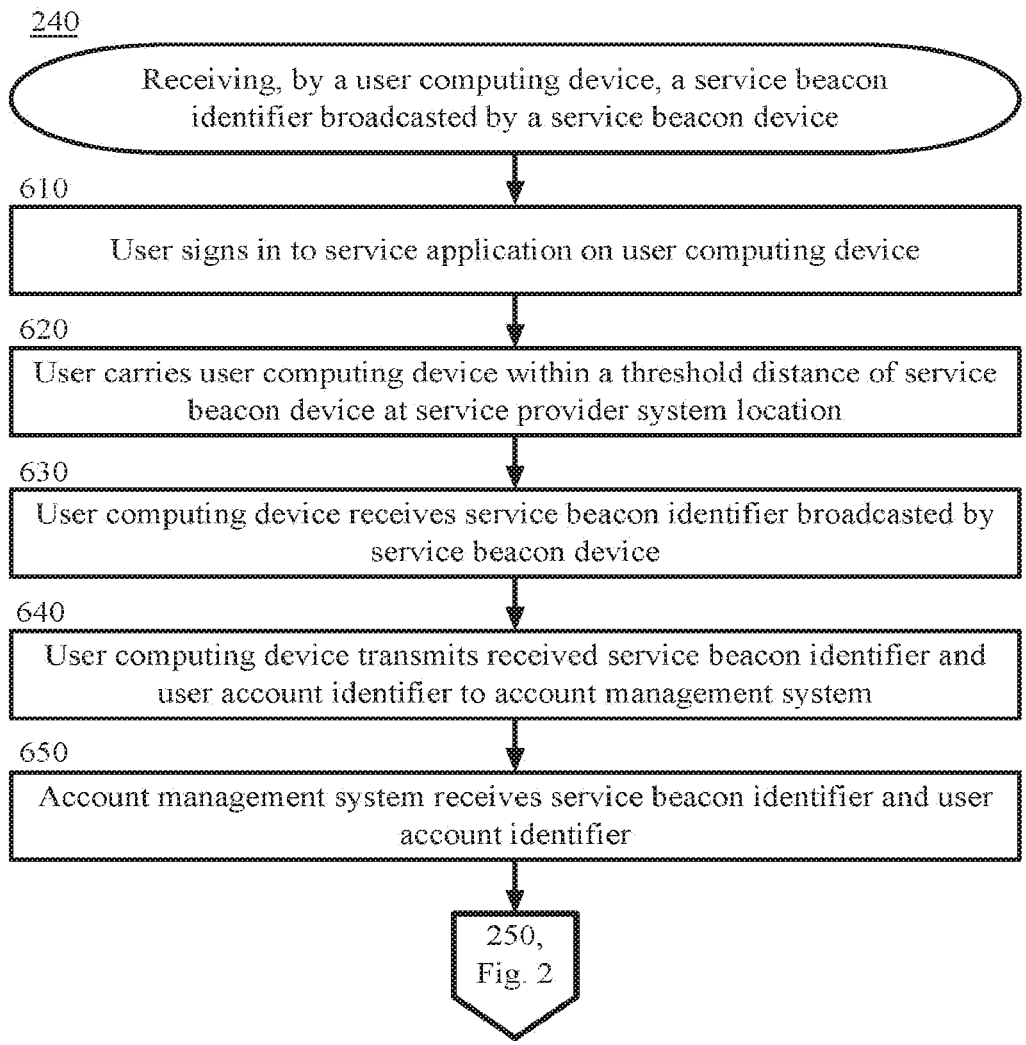
FIG. 6 is a block flow diagram depicting a method for receiving, by a user computing device, a service beacon device identifier broadcast by a service beacon device, in accordance with certain examples.

FIG. 6 is a block diagram depicting a method 240 for receiving, by a user computing device 110, a service beacon device 120 identifier broadcast by a service beacon device 120, in accordance with certain examples. The method 240 is described with reference to the components illustrated in FIG. 1.

In block 610, the user 101 signs in to the service application 112 on the user computing device 110. In an example, the user 101 may have a username and password associated with the user 101 account maintained by the account management system 150. In an example, the user 101 opens the service application 112 on the user computing device 110 and enters a username and/or password via the user interface 111 to sign in to the service application 112. In an example, when the user 101 is signed in to the service application 112, the service application is able to communicate with the account management system 150 over the network 140. In this example, when the user 101 is not signed in to the service application 112, the service application does not communicate with the account management system 150 even if the a network 140 connection is available. In an example, the user 101 may sign out of the service application 112 at any time by actuating one or more objects on the user interface 111 of the user computing device 110. In an example, after signing in to the service application 112, the user 101 configure one or more user 101 account settings, add, edit, or delete user 101 payment account information, and/or change user 101 preferences. In certain examples, a user 101 may be required to make a feature selection to obtain the benefits of the techniques described herein. For example, the user 101 may have to enable one or more user 101 account settings to enable hands free transactions according to the methods described herein.

In an example, service application 112 may provide options, data, configurable alerts, and other suitable features to the user 101. For example, the service application 112 may comprise a listing of service provider systems and service provider locations that participate in hands free payment transactions according to one or more of the methods described herein. The listing may be updated periodically from the account management system 150. The service application 112 may notify the user 101 when the user 101 is within a configured vicinity of a participating service provider system. The service application 112 may provide the user 101 with options to update payment preferences. The service application 112 may provide the user 101 with a listing of recent transactions. The service application 112 may provide any other suitable information to the user 101.

In block 620, the user 101 carries the user computing device 110 within a threshold distance of the service beacon device 120 at the service provider system location. In an example, the user 101 enters a location of the service provider system. The user 101 may enter the service provider location carrying the user computing device 110 in a pocket or a bag, in the hands of the user 101, or in any suitable manner. The location of the service provider system may be a store location, a kiosk location, or any suitable physical location of a service provider system. In another example, a service provider POS operator 102 may be mobile and arrive at a location of the user 101. For example, the service provider system may be a restaurant and the service provider POS device operator 102 may be a delivery person possessing a portable service computing device 130.

In certain examples, the service application 112 may alert the user 101 when the user 101 is in the vicinity of a service provider system that accepts hands-free payments. The alert may be provided via a message on the user computing device 110, via an email or a text, or in any suitable manner. In an example, the alert may be based on the location of the user 101 as determined by a GPS module 119 resident on the user computing device 110. For example, the service application 112 accesses the GPS data from the GPS module 119 and compare the GPS location to a list of locations of service provider systems that accept hands free payments. For example, the service application 112 comprises a list or accesses a list maintained by the account management system 150 of service provider system locations that accept hands free payments. If a match results from the comparison, then an alert is generated and provided to the user 101. The match may result if the user 101 is within a configured distance of a qualified service provider system location. In an example, the alerts may be configured to alert in any suitable manner. In an example, the alerts may be combined in commercially dense environments or the alerts may be presented individually. In another example, the alerts may be configured to only alert the user 101 a configured number of times. For example, the alert may be presented three times, but upon a fourth instance, the alert is not presented. The alerts may be presented as a notification with an audible alert, a vibration, a popup alert on the user interface 111 of the user computing device 110, or other suitable alert.

In block 630, the user computing device 110 receives a service beacon device 120 identifier broadcast by the service beacon device 120. The user computing device 110 recognizes a service beacon device 120 via wireless communication at the location of the service provider system. The user computing device 110 may be configured to search for beacons or other wireless signals. In an example, the user computing device 110 and the service beacon device 120 establish a Wi-Fi wireless network 140 connection. In other examples, the user computing device 110 and the service beacon device 120 establish a Bluetooth, BLE, NFC, or other appropriate network 140 connection Upon entering the range of the signal of the service beacon device 120, the user computing device 110 receives the service beacon device 120 identifier.

In block 640, the user computing device 110 transmits the received service beacon device 120 identifier and a user 101 account identifier to the account management system 150. In an example, the user computing device 110 transmits the data received in the service beacon device 120 identifier along with a user 101 account identifier to the account management system 150 over the network 140.

In block 650, the account management system 150 receives the service beacon device 120 identifier and the user 101 account identifier. For example, the account management system 150 receives the service beacon device 120 identifier and the user 101 account identifier over the network 140. The user computing device 110 may compare the data from the service beacon device 120 identifier to a database of service beacon device 120 identifier data and service camera device identifier data to determine an identity of the service provider system and service camera device 135 associated with the service beacon device 120 identifier and/or to verify the authenticity of the beacon.

From block 750, the method 240 proceeds to block 250 in FIG. 2.

Returning to FIG. 2, in block 250, the service computing device 130 receives a facial template for each user 101 in range of the service beacon device 120. The method for receiving, by a service computing device 130, a facial template for each user 101 in range of the service beacon device 120 is described in more detail hereinafter with reference to the method 250 described in FIG. 7.

Figure 7:
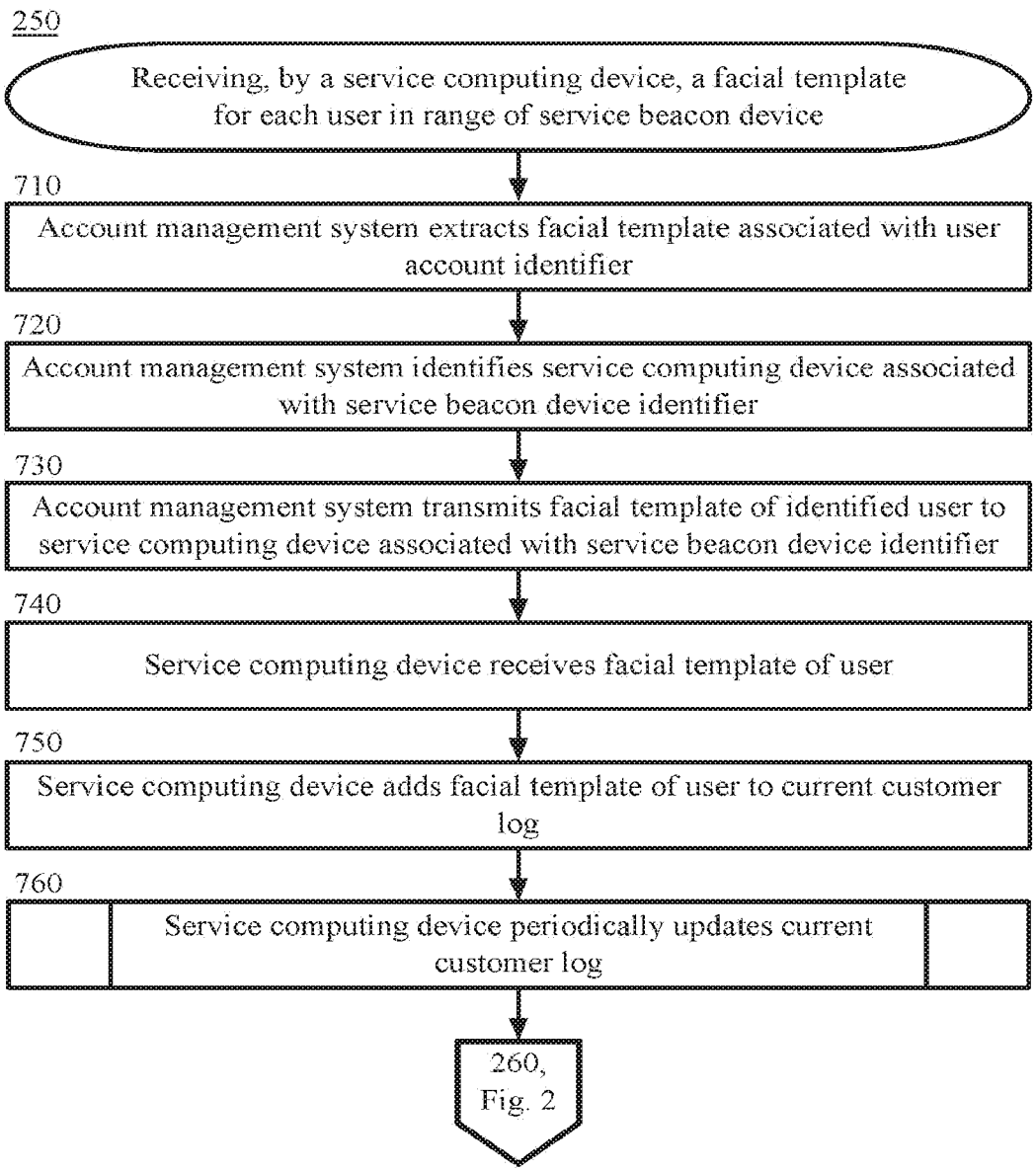
FIG. 7 is a block flow diagram depicting a method for receiving, by a camera device, a facial template for each user in range of a service beacon device, in accordance with certain examples.

FIG. 7 is a block diagram depicting a method 250 for receiving, by a service computing device 130, a facial template for each user 101 in range of the service beacon device 120, in accordance with certain examples. The method 250 is described with reference to the components illustrated in FIG. 1.

In block 710, the account management system 150 extracts a facial template associated with the user 101 account identifier. In an example, the account management system 150 accesses a database comprising stored facial templates of a plurality of users 101 with corresponding user 101 account identifiers for each user 101. For example, this database is stored in the data storage unit 155.

In block 720, the account management system 150 identifies a service computing device 130 associated with the service beacon device 120 identifier. In an example, the account management system 150 recognizes that the service beacon device 120 identifier is associated with the account management system 150 and a particular service computing device 130 at the service provider system location. In an example, the account management system 150 recognizes that the service beacon device 120 identifier is associated with a plurality of service camera devices 140 installed at a particular service provider location.

In block 730, the account management system 150 transmits the facial template of the identified user 101 to the service computing device 130 associated with the service beacon device 120 identifier. In another example, the account management system 150 transmits the facial template of the identified user 101 to a plurality of service computing devices 130 associated with the service beacon device 120 identifier. In certain examples, the account management system 150 receives, in real time, a plurality of transmissions from user computing devices 101 corresponding to a plurality of users 101 present at the service provider system location, each transmission comprising a user 101 account identifier and a retransmitted service beacon device 120 identifier. In these examples, the account management system 150 retrieves, in response to receiving each such transmission, a facial template associated with the received user 101 account identifier and transmits a facial template to one or more service camera devices 140 at the service provider location associated with the service beacon device 120 identifier.

In block 740, the service computing device 130 receives the facial template of the user 101. In another example, a plurality of service computing devices 130 receive the facial template of the user 101. In yet another example, the service computing device 130 and/or the plurality of service computing devices 130 receive one or more additional facial templates from the account management system 150 corresponding to one or more users 101 other than the instant user 101 having user computing devices 110 in network 140 connection to a service beacon device according to the method previously described herein. For example, the one or more additional facial templates are received in real time from the account management system 150 as additional users 101 other than the instant user 101 receive the service beacon device 120 identifier over a wireless communication network 140 or otherwise establish a network 140 connection between their user computing devices 110 and one or more service beacon devices 120. For example, the one or more service camera devices 140 may receive one or more additional facial templates corresponding to one or more additional users 101 at a time before, at the same time, or after the time at which the service computing device 130 receives the facial template of the instant user 101.

In block 750, the service camera computing device 130 adds the facial template of the user 101 to a current customer log. In an example, the current customer log is accessible by the service computing device 130 and by the account management system 150. In another example, the current customer log is additionally accessible by the service computing device 130 and/or an applicable computing device of the service provider system. In an example, the account management system 150 comprises and maintains the current customer log, which the service computing device 130 may access via the network 140. In another example, the service computing device 130 comprises and maintains the current customer log, which is accessible to the account management system 150 by communicating with the user computing device 110 via the network 140.

In block 760, the service computing device 130 periodically updates the current customer log. The method for receiving, by a service camera device 135, notification from a account management system 150 as users 101 enter or leave a network range of a service beacon device 120 is described in more detail hereinafter with reference to the method 760 described in FIG. 8.

Figure 8:
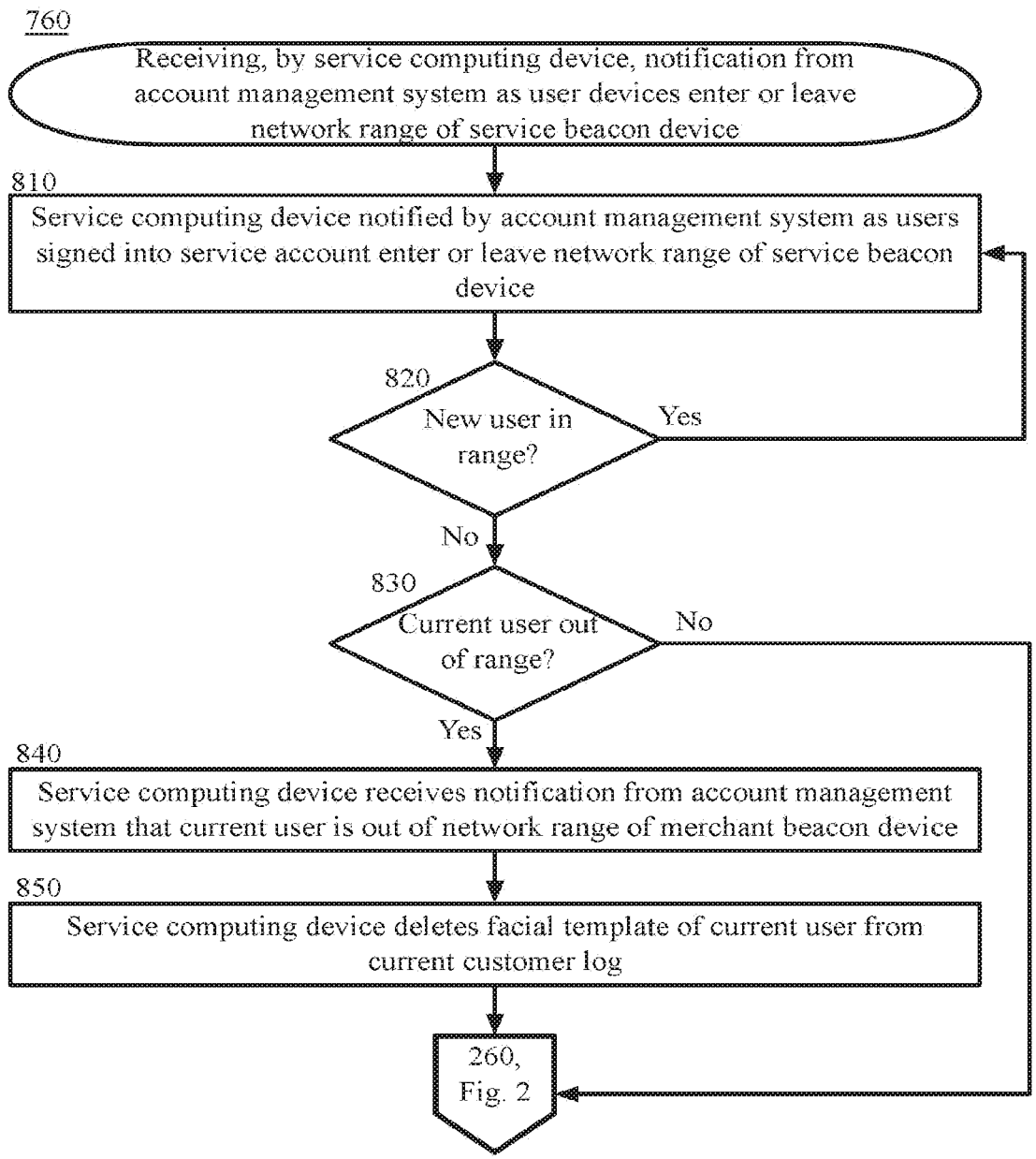
FIG. 8 is a block flow diagram depicting a method for receiving, by a service computing device, notification from an account management system as user devices enter or leave a network range of a service beacon device, in accordance with certain examples.

FIG. 8 is a block diagram depicting a method 760 for receiving, by a service camera computing device 130, notification from a account management system 150 as users 101 enter or leave a network range of a service beacon device 120, in accordance with certain examples. The method 760 is described with reference to the components illustrated in FIG. 1.

In block 810, the service computing device 130 is notified by the account management system 150 as users 101 signed into a service account enter or leave a network range of the service beacon device 120. For example, as previously discussed, when a user 101 carrying a user computing device 110 enters a threshold distance from a service beacon device 120, the service beacon device 120 or the user computing device 110 of the user 101 are able to detect the other device and establish a wireless network 140 connection between the two devices at the service provider system location. In this example, the service beacon device 120 transmits the service beacon device 120 identifier corresponding to the service beacon device 120 over the wireless network 140 to the user computing device 110. For example, the service beacon device 120 transmits the service beacon device 120 identifier to the user computing device 110 via a Wi-Fi, Bluetooth, BLE, or NFC wireless communication network 140. In this example, the user computing device 110 retransmits the received service beacon device 120 identifier to the account management system 150 along with a user 101 account identifier identifying the user 101.

In block 820, the service computing device 130 determines whether a new user 101 is in range of the service beacon device 120. For example, if the account management system 150 receives a new user 101 account identifier in addition to the same service beacon device 120 identifier, the account management system 150 may determine that a new user 101 is in range of the service beacon device 120. In this example, the account management system 150 may infer that the new user 101 has entered the service provider location based on receipt of the new user 101 account identifier. In another example, if the account management system 150 does not receive any new user 101 account identifiers along with the same service beacon device 120 identifier within a threshold length of time, the account management system 150 may determine that no new users 101 have entered the network 140 range of the service beacon device 120.

If a new user 101 is in range of the service beacon device 120, the method 860 proceeds to block 830 in FIG. 8. For example, the account management system 150 receives a new user 101 account identifier in addition to the same service beacon device 120 identifier. In this example, the account management system 150 infers that the new user 101 has entered the service provider location based on receipt of the new user 101 account identifier and the same service beacon device 120 identifier as previously received from the first user 101.

Returning to FIG. 8, in block 810, the account management system 150 extracts a facial template associated with the new user 101 account identifier. In an example, the account management system 150 transmits the facial template to the appropriate one or more service computing devices 130 and the one or more service computing devices 130 add the new user's 101 facial template to the current customer log according to the example method previously described in method 250 in FIG. 7.

Returning to FIG. 8, in block 820, if there is a not a new user 101 in range of the service beacon device 120, the method 760 proceeds to block 830. For example, the account management system 150 does not receive any new user 101 account identifiers along with the same service beacon device 120 identifier within a threshold length of time and determines that no new users 101 have entered the network 140 range of the service beacon device 120.

In block 830, the service camera device 135 determines whether a current user 101 has moved out of range of the service beacon device 120. In an example, the user computing device 110 continues to receive from the service beacon device 120 identifier from the service beacon device 120 and retransmit the service beacon device 120 identifier along with the user 101 account identifier to the account management system 150. In this example, the user computing device 110 may periodically transmit information comprising the service beacon device 120 identifier and user 101 account identifier to the account management system 150 as long as the user computing device 110 continues to detect the service beacon device 120 and receive the service beacon device 120 identifier via periodic scans. For example, the user computing device scans for the service beacon device 120 every five seconds. In another example, the user computing device 110 may periodically transmit information comprising the service beacon device 120 identifier and user 101 account identifier to the account management system 150 as long as the user computing device 110 maintains a wireless network 140 connection with the service beacon device 120. For example, the user computing device 110 may transmit this information to the account management system 150 at every five seconds. In this example, if the account management system 150 ceases to receive the information from the user computing device for a predefined number of intervals, the account management system 150 may determine that the corresponding user 101 has moved out of range of the service beacon device. In this example, if the account management system 150 continues to receive the information transmitted by the user computing device 110 at the expected intervals, the account management system 150 determines that the user 101 is still in network 140 range of the service beacon device 120.

If no current user 101 has moved out of range of the service beacon device 120, the method 860 proceeds to block 260 in FIG. 2. For example, the account management system 150 continues to receive the service beacon device 120 identifier and user 101 account identifier transmitted by the user computing device 110 at the expected intervals and determines that the user 101 is still in network 140 range of the service beacon device 120.

Returning to block 260, in FIG. 2, the service computing device 130 identifies the user 101 via facial recognition.

Returning to FIG. 8, in block 830, if a current user 101 has moved out of range of the service beacon device 120, the method 760 proceeds to block 840.

In block 840, the service computing device 130 receives a notification from the account management system 150 that a current user 101 is out of network range of the service beacon device 120. In another example, the service computing device 130 receives a notification from the account management system 150 that the user computing device 110 associated with the current user 101 has stopped sending notifications to the account management system 150 comprising the service beacon device 120 identifier. For example, the service computing device 130 receives the user 101 account identifier associated with the current user 101 associated with a user computing device 110 that is either out of network range or has stopped transmitting notifications comprising the service beacon device 120 identifier to the account management system 150, accesses the current customer log, and finds an entry corresponding to the current user 101. For example, the current customer log is maintained by the account management system 150 and the service computing device 130 accesses the current customer log over the network 140 by communicating with the account management system 150. In another example, the account management system 150 does not transmit a notification to the service computing device 130 that the current user 101 is out of network range. In this example, the account management system 150 accesses the current customer log and deletes the facial template of the current user 101 from the current customer log.

In block 850, the service computing device 130 deletes the facial template of the current user 101 from the current customer log. For example, the current customer log comprises a table and the service computing device 130 deletes or requests the deletion of an entry or row corresponding to data associated with the current user 101 for which the service camera device 135 received the notification. In another example, the account management system 150 accesses the current customer log and deletes the facial template of the current user 101 from the current customer log.

From block 850, the method 760 proceeds to block 260, in FIG. 2.

Returning to FIG. 2, in block 260, the service computing device 130 identities the user 101 via facial recognition. The method for identifying, via a service computing device 130, a user 101 via facial recognition is described in more detail hereinafter with reference to the method 260 described in FIG. 9.

Figure 9:
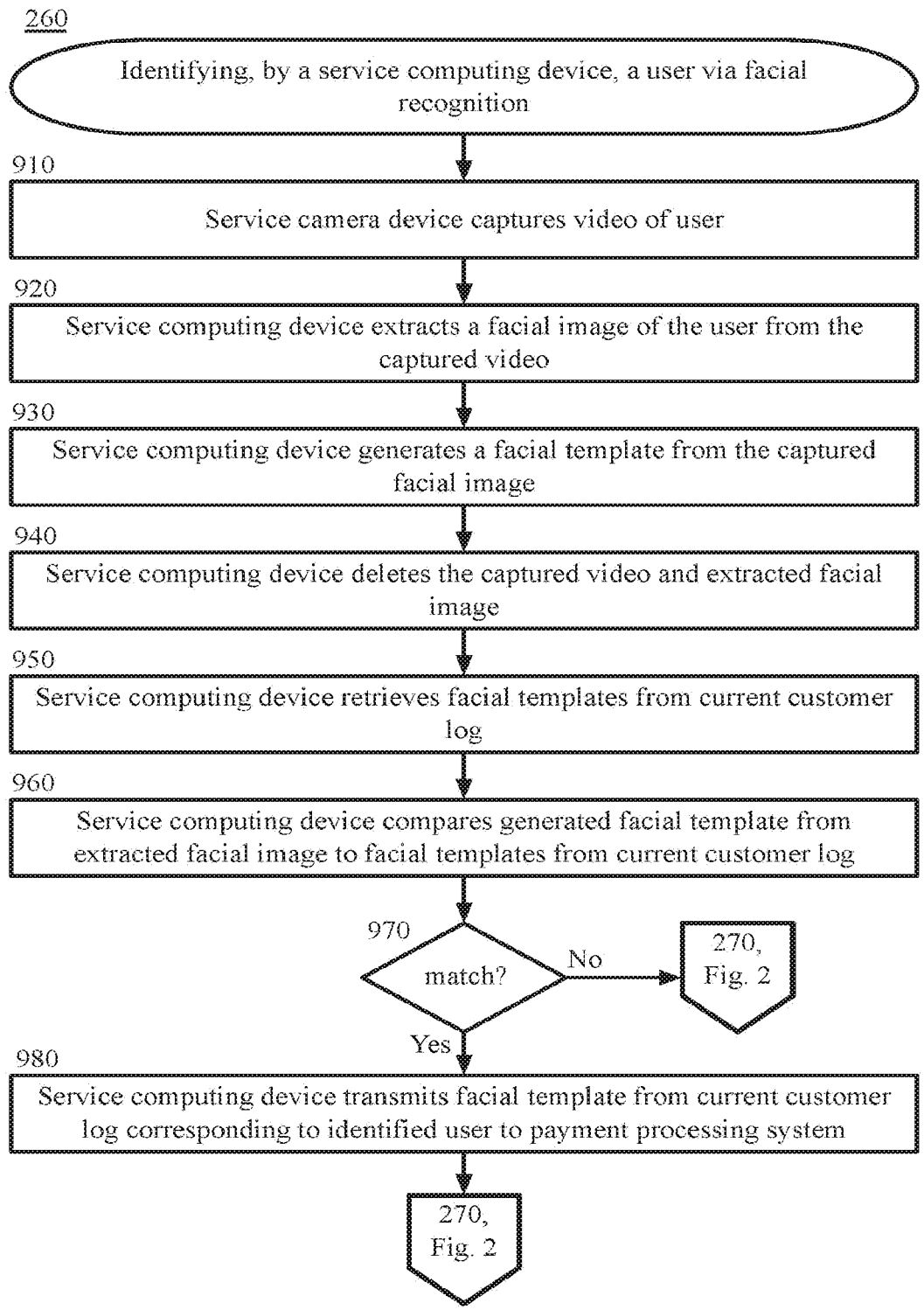
FIG. 9 is a block flow diagram depicting a method for identifying, by a service computing device, a user via facial recognition, in accordance with certain examples.

FIG. 9 is a block diagram depicting a method 260 for identifying, via a service computing device 130, a user 101 via facial recognition, in accordance with certain examples. The method 260 is described with reference to the components illustrated in FIG. 1.

In block 910, the service computing device 130 captures video feed of the user 101. In an example, in response to receiving a request to identify the user 101, the service computing device 130 activates the camera component 136 of a service camera device 135 to begin to capture a video of the surroundings of the service camera device 135. In an example, the service camera device 135 captures a video feed. In another example, the service camera device 135 continuously captures, but does not record, a video feed of its surroundings. In this example, when the service camera device 135 receives a request to identify the user 101 from the account management system 150, the service camera device 135 beings to record the video feed for a threshold amount of time. In an example, the user 101 may be moving during the period in which the service camera device 135 records the video feed. In an example, a processor 137 of the service camera device 135 extracts a facial image by determining a particular frame of the video feed and area of the instance of the video feed corresponding to the face of the user 101.

In block 920, the service computing device 130 extracts a facial image of the user 101 from the captured video feed. In an example, the service computing device 130 determines a frame of the captured video to provide an image of the user's 101 face and extracts the frame of the captured video comprising the facial image of the user 101.

In certain other examples, the service computing device 130 determines a frame of the captured video to provide an image of the faces of a plurality of users 101. For example, the frame comprises an image of the face of a first user 101, a second user 101, and a third user 101 at different locations in the image. In this example, one service camera device 135 may capture video of an environment corresponding to an area in the proximity of multiple service computing devices 130. In this example, the service computing device 130 may determine to which particular service computing device 130 each of the plurality of faces of the corresponding plurality of users 101 in the extracted image.

In an example, in which a service camera device 135 is mounted at an angle parallel to a plurality of adjacent service computing devices 130, the field of view of the service camera device 135 may be divided into bounding boxes such that each bounding box is assigned to a particular service computing device 130. In this example, since one or more users 101 may be situated between any two adjacent service computing devices 130, the bounding boxes may overlap. In this example, each bounding box is assigned to at most two adjacent service computing devices 130. In this example, in which the service camera device 135 is mounted parallel to a plurality of adjacent service computing devices 130, the size of a detected facial image of a user 101 is directly proportional to the distance the user 101 is from a service computing device 130 detected in the image. In this example, the service computing device 130 assigns each detected facial image to one or two particular service computing devices 130 based on the position of the facial image relative to the bounding boxes.

In another example, the service camera device 135 is mounted at an angle that is not parallel to a plurality of adjacent service computing devices 130. In this example, the service camera device 135 may be able to monitor an environment comprising a greater number of adjacent service computing device 130 than the example in which the service camera device 135 is mounted parallel to adjacent service computing devices 130 in this example, however, the size of a detected facial image is not proportional to the distance between a service computing device 130 detected in the image and the detected facial image. In this example, the service computing device 130 assigns each detected facial image to one or two particular service computing devices 130 based on the position of the facial image relative to the bounding boxes.

In block 930, the service computing device 130 generates a facial template from the captured facial image. In an example, the facial template is of a predetermined size, for example, a 128-byte facial template. In an example, the account management system 150 generates a facial template comprising a computer code representation of the digital facial image. For example, the facial template may describe key features of the facial image of the user 101, such as shape, color, line, value, space, form, texture, or other useful or relevant feature of the image or of particular regions of the image. In another example, the facial template is generated by processing the facial image through a convolutional neural network In an example, the service computing device 130 stores the generated facial template in a data storage unit 139 associated with the service camera device 135 and the service computing device 130. For example, the service computing device 130 database may comprise a log of facial templates of current customers wherein the service computing device 130 stores the generated facial template.

In certain other examples, the service camera device 135 continuously captures a video feed of its surroundings as users 101 enter and leave the vicinity of one or more service computing devices 130 over the course of a certain time period. In this example, the service camera device 135 processor 137 is able to continuously monitor the incoming video feed to detect faces from extracted frames of the video feed. In this example, the service camera device 135, each time the processor 137 detects the presence of one or more faces in the video feed, the service computing device 130 extracts a frame of the video feed comprising one or more facial images of one or more corresponding detected faces and creates facial templates based on the extracted one or more facial images. In this example, the service computing device 130 stores facial templates in the log of facial templates of current customers as they are generated. In this example, as the service computing device 130 generates a subsequent facial templates, the service computing device 130 determines whether the generated subsequent facial template is similar to within a threshold compared to any of the facial templates already stored in the log of facial templates of current customers. If the generated subsequent facial template is similar to within a threshold to any of the facial templates already stored in the log, the service computing device 130, after associating the facial template to one or two particular service computing devices 130 based on the position of the associated facial images in the extracted frame of the captured video, adds the facial template to the log of facial templates of current customers. If the generated subsequent facial template is not similar to within a threshold to any facial templates already stored in the log of facial templates of current customers, the service computing device 130 deletes or otherwise ignores and/or does nothing with the generated facial template. In this example, if the service computing device 130 determines that certain facial image is no longer in the field of the video feed, the corresponding facial template is deleted from the log of facial templates of current customers.

In block 940, the service computing device 130 deletes the captured video and the extracted facial image. For example, the service computing device 130 does not store captured images or video. In this example, facial templates generated by the service computing device 130 comprise computer code representations of facial images of users 101. In this example, after generating a facial template or after a threshold time has passed after capturing video or images or extracting an image from a video, the service computing device 130 deletes any captured or extracted video or images.

In block 950, the service computing device 130 retrieves facial templates from the current customer log. For example, the current customer log comprises facial templates received from the account management system 150 corresponding to all current users 101 whose associated user computing devices 110 are located within a network distance of a service beacon device 120.

In block 960, the service computing device 130 compares the generated facial template from captured facial image to facial templates from the current customer log.

In block 970, the service computing device 130 determines whether there is a match between the generated facial template and one of the facial templates from the current customer log. In this example, when the service computing device 130 determines a match between a first facial template in the log of facial templates of current customers and a second facial template the log of current customers, the service computing device 130 determines with which service provider one or two service computing devices 130 the second facial template is associated. In this example, the service computing device 130 updates the entry of the second facial template in the log of current customers with an annotation assigning the second facial template to a particular one or two service computing devices 130. For example, as previously discussed, the facial image upon which the facial template was located within a bounding box of an area of the video or image corresponding to one or two particular service computing devices 130. In this example, when the service computing device 130 generates a facial template for the facial image, the service computing device 130 associates the generated facial template with the particular one or two service computing devices 130. For example, if the facial image was in a bounding box in front of a first service computing device 130, the resulting facial template may be associated with the first service computing device 130. In another example, if the facial image was in a bounding box between the first service computing device 130 and a second, adjacent service computing device 130, the resulting facial template may be associated with both the first service computing device 130 and the second service computing device 130.

If a facial template from the current customer log matches the generated facial template, the method 260 proceeds to block 980. In another example, if a facial template from the current customer log matches a facial template from the log of facial templates of current customers, the method 260 proceeds to block 980.

In block 980, the service computing device 130 transmits the facial template from the current customer log corresponding to the identified user to the account management system 150. For example, the transmitted facial template comprises an annotation assigning the facial template to a particular one or two service computing devices 130.

From block 980, the method 260 proceeds to block 270 in FIG. 2. In this example, the account management system 150 identifies the user 101 requesting a service request and a particular service computing device 130 to which the user 101 is assigned and may proceed with processing the transaction.

Returning to block 970, if none of the facial templates from the current customer log matches the generated facial template, the method 260 proceeds to block 270 in FIG. 2. In another example, if none of the facial templates from the current customer log matches any of the facial templates from the log of facial templates of current customers, the method 270 proceeds to block 270 in FIG. 2.

Returning to FIG. 2, in block 270, the service computing device 130 identities the user 101 via movement recognition. The method for identifying, via a service computing device 130, a user 101 via movement recognition is described in more detail hereinafter with reference to the method 270 described in FIG. 10. In an example, the method 270 for identifying, by a service computing device 130, users 101 in a video feed based on movement data received from user computing devices 110 may be performed instead of or in addition to the method 260 for identifying users 101 in a video feed based on facial recognition. In other examples, the account management system 150 compares the video feed with the movement data to identify users 101 in the video feed.

Figure 10:
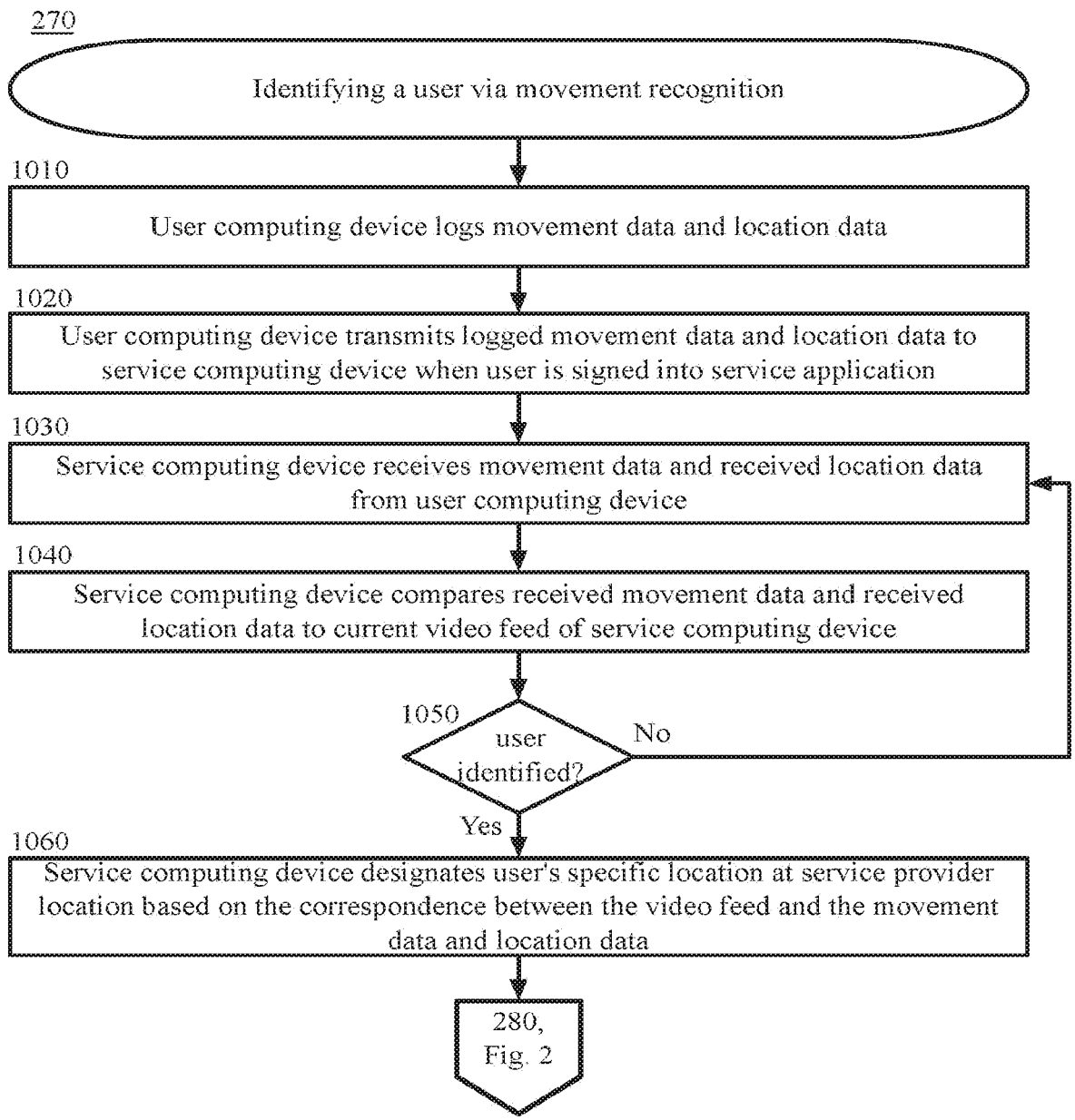
FIG. 10 is a block flow diagram depicting a method for identifying, by a service computing device, a user via movement recognition, in accordance with certain examples.

FIG. 10 is a block diagram depicting a method 270 for identifying, via a service computing device 130, a user 101 via movement recognition, in accordance with certain examples. The method 270 is described with reference to the components illustrated in FIG. 1.

In block 1010, the user computing device 110 logs movement data and location data. Example movement data comprises accelerometer 118 data and/or gyroscopic data of the user computing device 110, a user computing device 110 identifier, and timestamp data. For example, movement data comprises a velocity of the user computing device 110, an acceleration of the user computing device 110, an orientation of the user computing device 110, a rotation rate of the user computing device 110, or other data that describes or indicates an orientation, position, or a movement of the user computing device 110. For example, timestamp data comprises a current time comprising a year, month, date, hour of the day, minute of the hour, second of the minute, millisecond of the second, and/or other appropriate indication or indications of the time at which the timestamp is generated. Example location data comprises a longitude and latitude logged by the GPS module 119 of the user computing device 110.

In block 1020, the user computing device 110 transmits the logged movement and the location data to the service computing device 130 when the user 101 is signed into the service application 112. In an example, each user computing device 110 continuously or periodically transmits logged movement data to the service computing device 130 via a wireless communication channel if the user is signed in to the service application 112. In an example, if the user 101 is not signed in to the service application 112, the user computing device 110 does not transmit logged movement data to the service computing device 130 via the wireless communication channel. In other examples, the user computing device 10 continuously or periodically transmits logged movement data to the account management system 150 via the network 140 when the user 101 is signed in to the service application 112 on the user computing device 110. For example, in addition to transmitting a beacon device identifier to the account management system 150, each user computing device 110 at the service system location transmits movement data logged by the user computing device 110 to the account management system 150.

In block 1030, the service computing device 130 receives the movement data and the location data from the user computing device 110. In an example, the service computing device 130 receives the movement data from user computing devices 110 at the service provider location via the wireless communication channel. In another example, the service computing device 130 receives the movement data and the location data from the account management system 150, which received the movement data and the location data from each user computing device 110.

In block 1040, the service computing device 130 compares the received movement data and the received location data to the current video feed of the service computing device 130. For example, the service computing device 130 compares a received video feed with received movement data of user computing devices 110 to identify users in the video feed. In an example, the service computing device 130 receives a continuous video feed from the service camera device 135 comprising video captured of an area of the service provider system location. Example video feed data comprises timestamp data. In an example, the service computing device 130 defines a location of the area captured by the video feed associated with a service request area and determines an identity of the user computing device 110 within the service request area based on a received user computing device 110 identifier. In an example, the video feed comprises multiple service request areas, each service request area associated with a particular service computing device 130. For example, the account management system 150 receives the movement data from each user computing device 110 at the service provider system location via the network 140. In this example, the account management system 150 receives a video feed from the service computing device 130 and compares the received video feed with the movement data of user computing devices 110 to identify users 101 in the video feed. In this example, the account management system transmits identities of the users identified in the video feed to the service computing device 130. In another example, the account management system 150 transmits the received movement data to the service computing device 130 it the service provider location In this other example, the service computing device 130 compares the received video feed with movement data of user computing devices 110 received from the account management system 150 to identify users 101 in the video feed. In an example, the service computing device 130 defines a location of the area captured by the video feed associated with a service request area and determines an identity of the user 101 within the service request area. In an example, the video feed comprises multiple service request areas, each service request area associated with a particular service computing device 130. In this example, the service computing device 130 or account management system 150 determines an identity of a particular user 101 within each service request area associated with each particular corresponding service computing device 130.

In an example, the service computing device 130 or the account management system 150 may be trained to identify users 101 in a video feed based on movement data received from user computing devices 110. For example, a service application 130 on each user computing device 110 at the service provider system location logs data from accelerometers 118 and/or gyroscopes and sends that data via a wireless communication channel to a processing unit of the service computing device 130. The processor simultaneously records a video feed from a service camera device 135 communicatively coupled to the service computing device 130. In other examples, the service computing device 130 comprises the service camera device 135. In an example, the processing unit 137 uses a machine learning model to identify similarities between gyroscopic and accelerometer 118 data and visual data from the video feed received from the service camera device 135. In an example, the service computing device 110 uses previous identifications of user computing device 110 identifiers corresponding to objects video feeds based on correlation of movement data to changes in position of an object in the video feed identified as a potential user 101 to train the machine learning model to identify similarities between gyroscopic and accelerometer 118 data and visual data from the video feed In an example, the machine learning model identifies similarities between gyroscopic and accelerometer 118 data comprising and visual data from the video feed that corresponds to the same time period as the received gyroscopic and accelerometer 118 data. In this example, the time period may be determined based on time stamp data associated with the received video feed data and the received gyroscopic and accelerometer 118 data for each user computing device 110. For example, if a user 101 were to pull his or her user computing device 110 out of his or her pocket at a time period A, the service computing device 130 would identify a signature both in the video feed as well as a corresponding signature from the received movement data comprising the gyroscopic and the accelerometer 118 data during the same time period A. The processing unit would associate the changes in the movement data with changes in the video feed data during the time period and would associate a user computing device 110 identifier with a service request area in the video feed for the time period. In example, the time period comprises a time period that terminates at the current time. In an example, the service request area corresponds to a location in front of the service computing device 130. The processing unit would identify the user 101 based on the user computing device 110 identifier or receive, from the account management system 150, an identity of the user 101 in response to transmitting a request for the identity of the user 101 to the account management system along with the user computing device 110 identifier in the service request area.

For example, the machine learning system is structured as follows: the service computing device 130 or account management system 150 enters received gyroscopic data and accelerometer 118 data for each user computing device 110 at the location into a Long Short Term Memory ("LSTM") Model and a Deep Neural Network ("DNN") Classifier to compare data from the video feed to the gyroscopic data and accelerometer 118 data and detect users 101 within the video feed. In an example, the service computing device 130 or the account management system 150 uses the DNN classifier to detect potential users 101 within the video feed based on object recognition. For example, the DNN classifier executes a person recognition algorithm on the service computing device for each frame of the video feed to determine where each user 101 is located in the fame. In an example, the service computing device 130 or the account management system 150 uses the DNN Classifier to determine whether a region of the video feed that corresponds to a potential user 101 is associated with a particular user computing device 110 represented by the received user computing device 110 movement data. In an example, the LSTM Model operates on the service application 112 on each user computing device 110 at the service provider system location to generate a serializable encoding of gyroscopic signatures and accelerometer signatures. The service computing device 130 or the account management system 150 uses the DNN Classifier to compare a serializable encoding of gyroscopic signatures and accelerometer 118 signatures with the visual data for each detected person in the video feed to determine a similarity score. In an example, if the similarity score for a particular user computing device 110 identifier is greater than a predetermined threshold, the service computing device 130 or the account management system 150 uses the DNN classifier to determine that the user computing device 110 identifier corresponds to the detected person in the video feed.

In other examples, instead of determining the user computing device 110 identifier that corresponds to the detected person in the video feed based on a similarity score being greater than a predetermined threshold, the DNN classifier uses a tiered threshold matching system. In an example tiered threshold matching system, the DNN determines a strong match and a weak match for each detected person in the video feed. The example strong match comprises a higher threshold similarity score than the example weak match so as to maximize precision. For example, a similarity score is determined based on comparing a signature from the video feed as well as a corresponding signature from the received movement data comprising the gyroscopic and the accelerometer 118 data during a time period. The example weak match comprises a threshold similarity score low enough so that an actual present match would be a weak match. In an example, the DNN classifier generates strong and weak matches for all detected objects detected to be persons in the video feed and tracks a unique strong match for a detected object. If a strong match is not present, the DNN classifier tracks a unique weak match for the detected object for all frames of the video feed. Once all detected objects resembling potential persons are tracked, the DNN classifier determines if multiple user computing devices 110 match a single tracked object in any frame of the video feed. Any frames of the video feed for the single tracked object for which the tracked object is assigned to more than one user computing device 110 are excluded from consideration when determining movement of the object in the video feed.

In block 1050, the service computing device 130 determines if a user 101 can be identified in the video feed based on comparing the received movement data and the received location data to the current video feed of the service computing device 130. In an example, determining if a user 101 can be identified in the video feed comprises determining whether the user 101 can be identified in the video feed within a service area of the video feed.

If the service computing device 130 does not identify a user 101 in the video feed, the method 270 returns to block 1030. In block 1030, the service computing device 130 receives subsequent movement data and subsequent location data from the user computing device 110.

Returning to block 1050, if the service computing device 130 identifies a user 101 in the video feed, the method 270 proceeds to block 1060. In an example, the service computing device 130 uses the DNN Classifier to determine whether a region of the video feed that corresponds to a potential user 101 is associated with the user computing device 110 represented by the received user computing device 110 movement data. In an example, the LSTM Model operates on the service application 112 on the user computing device 110 at the service provider system location to generate movement data comprising a serializable encoding of gyroscopic signatures and accelerometer signatures. The service computing device 130 uses the DNN Classifier to compare a serializable encoding of gyroscopic signatures and accelerometer 18 signatures with the visual data for the object in the video feed comprising the potential user 101 to determine a similarity score In an example, if the similarity score for a particular user computing device 110 identifier is greater than a predetermined threshold, the service computing device 130 uses the DNN classifier to determine that the user computing device 110 identifier corresponds to the detected user 101 in the video feed.

In block 1060, the service computing device 130 designates a user's 101 specific location at the service provider system location based on the correspondence between the video feed and the movement data and the location data. In an example, the user's 101 specific location at the service provider location is designated as being in a service area if the correspondence of gyroscopic and/or accelerometer 118 data of the user computing device 110 with the video feed indicates that the user 101 is in a service area of the service provider system location. For example, the service area comprises an area within a threshold proximity to the service computing device 130 within which the user 101 may initiate a service request.

From block 1060, the method 270 proceeds to block 280 in FIG. 2.

Returning to FIG. 2, in block 280, the user 101 initiates a service request at the service computing device 130. For example, a service request comprises a payment transaction. The method for initiating, by a user 101, a service request at a service computing device 130 is described in more detail hereinafter with reference to the method 280 described in FIG. 11. In the examples described herein, the user 101 initiates a service request comprising a "hands free transaction" at the service computing device 130. An example hands free transaction does not require any interaction with the user computing device 110 on the part of the user 101. In another example, a hands free transaction requires only minimal interaction with the user computing device 110 by the user 101.

Figure 11:
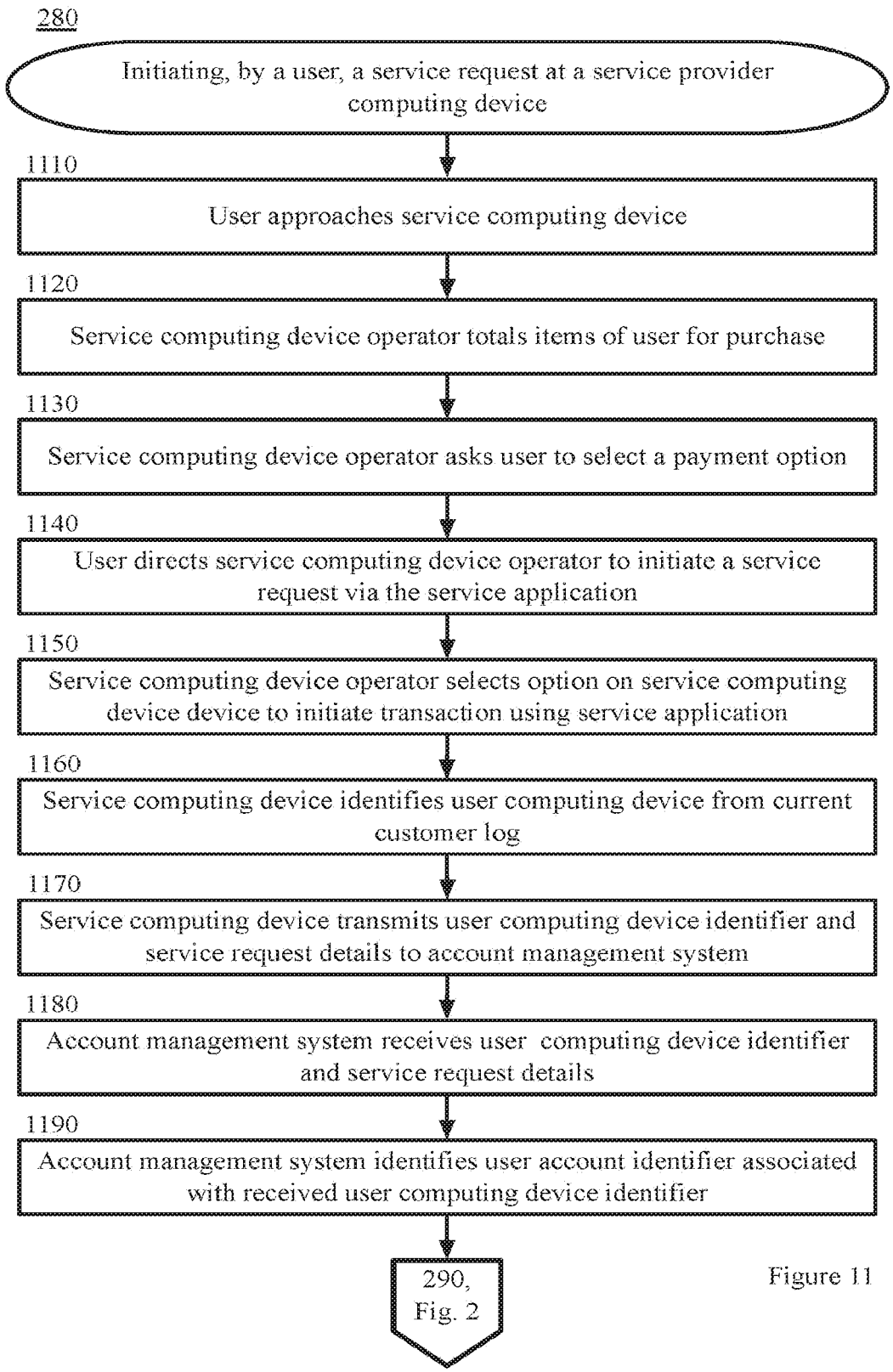
FIG. 11 is a block flow diagram depicting a method for initiating, by a user, a service request at a service computing device, in accordance with certain examples.

FIG. 11 is a block diagram depicting a method 280 for initiating, by a user 101, a transaction at a service computing device 130, in accordance with certain examples. The method 280 is described with reference to the components illustrated in FIG. 1.

In block 1110, the user 101 approaches the service computing device 130. In an example, at a time prior to approaching the service computing device 130, the user 101 browses the service provider system location and selects one or more items to purchase. In this example, the user 101 may collect the one or more items and carry, or otherwise transport via physical basket or shopping cart, the one or more items to the service computing device 130.

In block 1120, the service computing device 130 operator 102 totals the items of the user 101 for purchase. In an example, the service computing device operator 102 scans barcodes attached to the one or more items or otherwise enters descriptions and prices associated with the one or more items into the service computing device 130. In an example, after scanning or manually entering the items into the service computing device 130, the service computing device operator 102 actuates an object on the user interface 131 of the service computing device 130 to order the service computing device 130 to total the items. In an example, the service computing device 130 displays, via the user interface 131, the total to the user 101.

In block 1130, the service computing device 130 operator asks the user 101 to select a payment option. In an example, the service computing device 130 displays one or more payment options that the user 101 may select to use in a transaction. Example payment options may comprise payment via a service application 112 associated with the account management system 150, payment by cash, payment by check, payment by credit card, payment by debit card, and/or any other means of payment that the service provider system can or is willing to accept for payment from the user 101. In an example, the one or more payment options are displayed as objects on the user interface 131 and are selectable by the service system operator 102 in response to the user 101 directing the service system operator 102 to make a selection.

In another example, the account management system 150 or service camera device 135 transmits a notification to the service computing device 130 that the user 101 is able to initiate a transaction via the service application 112. In this example, the service computing device 130 notifies the service system operator 102 that the user 101 is able to participate in a service request using the service application 112. In this example, the service system operator 102 asks the user 101 to confirm whether the user 101 wants to initiate a transaction using the service application 112.

In block 1040, the user 101 directs the service system operator 102 to initiate a transaction via the service application 112. In an example, in response to receiving a verbal request from the user 101 to select the service application 112 as a payment option, the service system operator 102 actuates an object on the user interface 131 of the service computing device 130 corresponding to the service application 112 payment option.

In block 1150, the service system operator 102 selects an option on the service computing device 130 to initiate a transaction using the service application 112. In an example, the service computing device 130 displays a confirmation screen after the service system operator 102 selects an option to initiate a transaction using the service application 112. An example confirmation screen may display information summarizing the potential transaction and comprising one or more of a transaction total, a description of the one or more items being purchased by the user 101, and a indication that the user 101 selected the service application 112 as the method of payment for the transaction. An example confirmation screen may further display options to confirm the transaction or cancel the transaction. In an example, the user 101 reviews the confirmation screen, determines that the information displayed on the confirmation screen is correct, determines to continue with the transaction, and directs the service system operator 102 to select the option to confirm the transaction via the user interface 131.

In another example, the user 101 decides to abandon the transaction because the information is incorrect, or because the user 101 changed his mind and decided not to purchase the items. In yet another example, the confirmation screen further comprises an option to edit the transaction details. In this example, the service system operator 102, upon direction of the user 101, may select the option to edit the transaction details and may then edit, add, or delete one or more of the items in the transaction or edit payment details or payment methods for the transaction.

In block 1160, the service computing device 130 identifies the user 101 from the current customer log. For example, at this point, the service computing device 130 is aware that one or more users 101 are physically present in the service provider system location based on the current customer log maintained by the account management system 150 and accessible and editable by the service computing device 130. Additionally, the service computing device 130 is aware that a user 101 has initiated a transaction with the service application 112 payment method based on the request to process the transaction received from the service computing device 130. However, the service computing device 130 may not be aware of exactly which user 101 requested to process the hands free transaction involving the service application 112. In an example, the service computing device 130 continuously monitors a video feed received from the service camera device 135 and determines, in response to initiating the service request, that the user 101 is within the service area of the video feed based on comparing the movement data and the accelerometer 118 data to the video feed.

In block 1170, the service computing device 130 transmits a user computing device 110 identifier and service request details to an account management system 150. For example, in response to receiving an initiation of the service request and in response to identifying the user computing device 110 in the video feed as being located within the service area of the video feed based on correlating movement data and accelerometer 118 data received from the user computing device 110 to data from the video feed, the service computing device 130 transmits a user computing device 110 identifier to the account management system 150 corresponding to the user computing device 110 detected as being within the service area of the video feed. For example, the service computing device 130 transmits a user computing device 110 identifier and service request details to an account management system 150 via the network 140.

In block 1180, the account management system 150 receives the user computing device 110 identifier and the service request details. For example, the account management system 150 receives the user computing device 110 identifier and the service request details via the network 110.

In block 1190, the account management system 150 identifies a user 101 account identifier associated with the user computing device 110 identifier received from the service computing device 130. For example, the account management system 150 manages the user 101 account associated the user computing device 110.

From block 1190, the method 280 proceeds to block 290 in FIG. 2.

Returning to FIG. 2, in block 290, an account management system 150 processes a service request. The method for processing, by an account management system 150, a service request is described in more detail hereinafter with reference to the method 290 described in FIG. 12.

Figure 12:
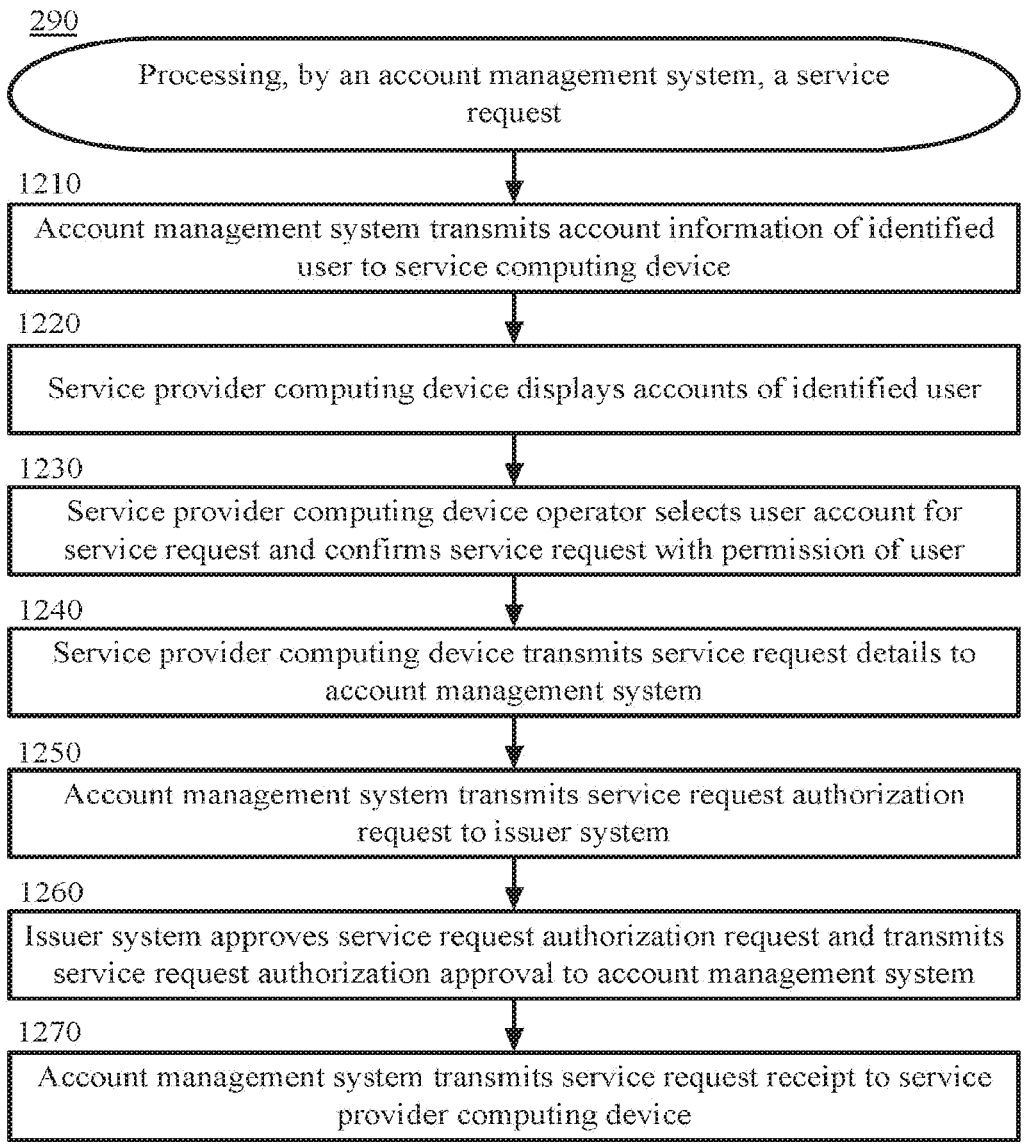
FIG. 12 is a block flow diagram depicting a method for processing, by an account management system, a service request, in accordance with certain examples.

FIG. 12 is a block diagram depicting a method 290 for processing, via an account management system 150, a service request, in accordance with certain examples. The method 290 is described with reference to the components illustrated in FIG. 1.

In block 1210, the account management system 150 transmits account information of the identified user 101 to the service computing device 130. For example, the user 101 account with the account management system 150 comprises payment account information associated with one or more payment accounts of the user 101. An example payment account of the user 101 comprises a credit account, bank account, stored value account, gift card, service provider system charge account, or other relevant user 101 account. In an example, the service computing device 130 does not receive complete payment information for one or more of the user 101 payment accounts. For example, the payment information may be obfuscated or truncated. For example, the service computing device 130 may only receive abbreviated payment information sufficient for a user 101 to identify a payment account via the user interface 131.

In block 1220, the service computing device 130 displays accounts of the identified user 101. In an example, the service computing device 130 does not display complete account information of the user 101 on the user interface 131. For example, for a credit card account, the service computing device user interface 131 may display only the name associated with the credit card, last four digits of the credit card number, and the expiration date.

In block 1230, the service computing device operator 102 selects a user 101 account for transaction and confirms the transaction with permission of the user 101. For example, the user 101 views the account options directly displayed on the user interface 131 or listens to the service computing device operator 102 read the user 101 payment account options to the user 101. In an example, the user 101 selects a payment account option to use in the transaction. For example, the user 101 decides to use a credit card account. In an example, the user 101 communicates a selection of a payment account for use in the transaction to the service computing device operator 102. In an example, in response to receiving the user's 101 indication of the payment account, the service computing device operator 102 selects the payment account indicated by the user 101 on the service computing device user interface 131.

In block 1240, the service computing device 130 transmits transaction details to the account management system 150. For example, the service computing device 130 transmits transaction details comprising a transaction total, an account identifier of the service provider system, and the selection of the user 101 account payment option. In an example, the account management system 150 receives the transaction details over the network 140. In an example, the account management system 150 extracts payment account information from the user 101 account corresponding to the received selection of the user 101 payment account.

In block 1250, the account management system 150 transmits a transaction authorization request to an issuer system. In an example, the account management system 150 generates a transaction authorization request comprising user 101 payment account information, service provider system payment account information, and a total amount of the transaction. In an example, the account management system 150 receives the transaction authorization request from the account management system 150 via the network 140.

In block 1260, the issuer system approves the transaction authorization request and transmits a transaction authorization approval to the account management system 150. In an example, the issuer system subtracts the user's 101 current account balance from the user's 101 credit limit associated with the user's 101 credit account. In an example, if the different between the credit limit and the credit balance is a positive number greater than the total amount of the transaction, the issuer system approves the transaction authorization. For example, the user 101 will not exceed his credit limit if the transaction were to be approved, therefore the issuer system approves the transaction authorization request. In an example, the account management system 150 receives the transaction authorization approval from the issuer system. In another example, the account management system 150 receives a denial of the transaction authorization request in response to the issuer system declining the transaction authorization request. In an example, if the issuer system approves the transaction authorization request, the issuer system credits the service provider system account and adds a charge to the user 101 credit account statement, bank account statement, or other appropriate statement.

In block 1270, the account management system 150 transmits a transaction receipt to the service computing device 130. For example, the account management system 150 transmits a confirmation of the approval of the transaction or a notice of a declined transaction to the service computing device 130 over the network 140. In an example, the service computing device 130 prints a receipt comprising a summary of a successful or unsuccessful transaction via a printer device that is a component of or otherwise communicatively coupled to the service computing device 130. In another example, the account management system 150 may transmit a transaction receipt to the user computing device 110 to be displayed on the user computing device. In yet another example, the service computing device 130 transmits a transaction receipt to the user computing device 110 to be displayed on the user computing device 110.

Additional Examples

In certain examples, the service computing device 130 processes a service request to determine and/or verify the identity of a user 101 for purposes of authentication, granting access, or personalizing experiences with the user 101 at the service provider system location. In an example, gaining access to a location or authorization to initiate a service request is restricted to a certain type of user 101 based on user 101 attributes or based on the identity of the user. An example user attribute is the age of the user. In this example, a user 101 signs into the service application 112 via the user computing device 110 and enters the service provider system location. The user computing device 110 receives a service beacon device identifier 120 from the service beacon device and transmits the identifier to the account management system 140. The account management system 140 transmits facial templates to the service computing device 130 corresponding to the user 101 and any other users 101 whose user computing devices 110 are in network range of the service computing device, who are signed in to the service application associated with the account management system. The service camera device 130 captures a facial image of the user 101 and identifies the user 101 by comparing the captured facial image against the received facial templates to find a match. In addition to or instead of facial recognition, the service computing device 130 identifies the user 101 in a video feed based on comparing movement data received from the user computing device 110 to data from a video feed captured by the service camera device 135. In an example, the user 101 requests to purchase a restricted item, for example, an alcoholic beverage. For example, the service provider system 130 location does not process service requests for users that are less than twenty one years old. In this example, the service computing device 130 approves or denies service request requested by the user 101 based on the user 101 identity and/or user 101 attributes.

In another example, only users 101 who are employees of the service provider system are authorized to access a door to a restricted room at the service provider system location. In this example, a user 101 attribute comprises a user's 101 name or identity. In this example, the user 101 requests to access the restricted area of the service provider system location or otherwise unlock a restricted access door. For example, the service computing device 130 comprises an electronic lock or a device communicatively coupled to an electronic lock. In an example, the service computing device 130 retrieves data comprising a set of user 101 identities allowed access to a restricted area. In an example, the service computing device 130 unlocks the electronic lock or otherwise allows access to the restricted area if the identity of the user 101 matches the user 101 identity of one of the users 101 of a set of users 101 allowed access to the restricted area In another example, based on the identity of the user 101 not corresponding to an identify of one of the set of users 101 allowed access to the restricted area, the service computing device 130 does not allow the user 101 access to the restricted area.

In another example, the service provider system location provides a personalized one-on-one experience to a user 101 based on the user's 101 service request history and habits. The process involves notifying service computing device 130 operators of the entry of a user 101 at the service provider location, the identity of the user 101, and any associated current or past service request history that will allow the service provider system 130 to streamline the experience and provide a satisfactory experience to the user 101 at the service provider system location. In an example, once the user 101 is identified via movement data recognition and/or facial recognition, the service computing device 130 displays details about the user 101 to the operator of the service computing device 130. For example, the user's 101 name, nickname, interests, and/or other relevant data is displayed to the operator so that the service computing device 130 operator can provide a personalized experience to the user at the service provider system location. For example, the operator views the name of the user 101, "Charlotte Thomas," displayed on the service computing device and says, "How may I help you today, Ms. Thomas?" In this example, the service computing device 130 may display current or past service request history of the user. For example, the service computing device 130 operator views the name of the user 101, "Charlotte Thomas," and that the user 101 requested a particular service request in the past. In this example, the service computing device 130 operator may greet the user 101 as follows: "How may I help you today, Ms. Thomas?" and then follow up with "Are you satisfied with your previous service request?"

In yet another example, a service provider system may identify a user 101 to provide delivery to a user 101. In this example, the user 101 signs into the service application via the user computing device 110 and enters the service provider system location. The user computing device 110 receives a service beacon device 120 identifier from the service beacon device 120 and transmits the identifier to the account management system 140. The account management system 140 transmits facial templates to the service computing device 130 corresponding to the user 101 and any other users 101 whose user computing devices 110 are in network range of the service beacon device 120 and who are signed in to the service application 112. The service camera device 135 captures a facial image of the user 101 and identifies the user 101 by comparing the captured facial image against the received facial templates to find a match. In another example, in addition to or instead of identifying the user 101 via facial recognition, the service computing device 130 identifies the user 101 in a video feed based on comparing movement data received from the user computing device 110 to data from a video feed captured by the service camera device 135. In this example, the identified user 101 requests to pickup and item that was previously ordered. In this example, based on the identity of the identified user 101 matching a user 101 identity associated with an item for pickup, the operator of the service computing device 130 delivers the item to the user 101. For example, the service computing device 130 operator determines the item for pickup associated with the identified user 101.

Other Examples

FIG. 13 depicts a computing machine 2000 and a module 2050 in accordance with certain examples. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"). PCI express (PCe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The examples described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different examples, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the examples, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to identify users, comprising, by one or more processors:
    obtaining visual data associated with one or more images depicting an object during a time period;
    obtaining movement data associated with a user computing device during the time period;
    providing the visual data and the movement data to one or more machine-learned classification models configured to identify similarities between the visual data and the movement data;
    comparing, using the one or more machine-learned classification models, the visual data and the movement data to determine a correlation during the time period between the object depicted in the one or more images of the visual data and the user computing device associated with the movement data; and
    based on a determined correlation between the visual data and the movement data, identifying the object depicted in the one or more images as corresponding to a user of the user computing device.

2. The computer-implemented method of claim 1, further comprising, by the one or more processors:
    detecting the object from a video feed comprising the visual data associated with the one or more images; and
    determining a change in position of the object in the video feed during the time period;

wherein the visual data provided to the one or more machine-learned classification models includes data indicative of the change in position of the object in the video feed.

3. The computer-implemented method of claim 2, wherein comparing the visual data and the movement data to determine the correlation comprises:
determining the correlation during the time period based on the change in the position of the object in the video feed and the movement data associated with the user computing device.

4. The computer-implemented method of claim 2, wherein determining the change in the position of the object in the video feed comprises determining a movement signature of the object.

5. The computer-implemented method of claim 2, wherein the movement data comprises a gyroscopic signature, wherein determining the change in the position of the object in the video feed comprises determining a movement signature of the object, and wherein comparing the change in the position of the object in the video feed with the change in the movement data received from the user computing device to determine the correlation comprises comparing the gyroscopic signature to the movement signature.

6. The computer-implemented method of claim 1, wherein:
the user computing device is a particular user computing device:
obtaining movement data comprises receiving, from each of a plurality of user computing devices, respective movement data indicating movement of such user computer device during the time period;
providing the movement data to the one or more classification machine-learned models comprises providing the respective movement data for each user computing device to the one or more machine-learned classification models; and
comparing the visual data and the movement data comprises determining the correlation during the time period between the object depicted in the one or more images of the visual data and the particular user computing device based on the respective movement data indicating movement of the particular user computing device.

7. The computer-implemented method of claim 1, wherein the movement data comprises at least one of a gyroscopic signature or an accelerometer signature.

8. The computer-implemented method of claim 1, further comprising, by the one or more processors:
receiving a request to initiate a service request; and
transmitting a user computing device identifier corresponding to the user computing device and a request to process the service request to an account management computing system.

9. The computer-implemented method of claim 8, further comprising, by the one or more processors:
receiving, from the account management computing system, data corresponding to one or more accounts of the particular user;
displaying at least a portion of the data corresponding to the one or more accounts of the particular user;
receiving an input of a selection of a particular account for use in the service request; and
transmitting, to the account management computing system, the selection of the particular account, wherein the account management computing system processes the service request using the particular account.

10. The computer-implemented method of claim 8, further comprising, by the one or more processors:
determining a change in position of the object from a first position to a second position during the time period
determining that the second position of the object is within a defined area of a video feed associated with a service request area, wherein the request to process the service request is transmitted in response to determining that the second position of the object is within the service request area associated with the video feed.

11. A computing system, comprising:
one or more processors; and
one or non-transitory computer readable media that collectively store instructions that when executed by the one or more processors cause the one or more processors to perform operations, the operations comprising:
obtaining visual data associated with one or more images depicting an object during a time period;
obtaining movement data associated with a user computing device during the time period;
providing the visual data and the movement data to one or more machine-learned classification models configured to identify similarities between the visual data and the movement data;
comparing, using the one or more machine-learned classification models, the visual data and the movement data to determine a correlation during the time period between the object depicted in the one or more images of the visual data and the user computing device associated with the movement data; and
based on a determined correlation between the visual data and the movement data, identifying the object depicted in the one or more images as corresponding to a user of the user computing device.

12. The computing system of claim 11, wherein the operations further comprise:
detecting the object from a video feed comprising the visual data associated with the one or more images; and
determining a change in position of the object in the video feed during the time period;
wherein the visual data provided to the one or more machine-learned classification models includes data indicative of the change in position of the object in the video feed.

13. The computing system of claim 12, wherein comparing the visual data and the movement data to determine the correlation comprises:
determining the correlation during the time period based on the change in the position of the object in the video feed and the movement data associated with the user computing device.

14. The computing system of claim 12, wherein determining the change in the position of the object in the video feed comprises determining a movement signature of the object.

15. The computing system of claim 12, wherein the movement data comprises a gyroscopic signature, wherein determining the change in the position of the object in the video feed comprises determining a movement signature of the object, and wherein comparing the change in the position of the object in the video feed with the change in the movement data received from the user computing device to determine the correlation comprises comparing the gyroscopic signature to the movement signature.

16. The computing system of claim 11, wherein:

the user computing device is a particular user computing device:

obtaining movement data comprises receiving, from each of a plurality of user computing devices, respective movement data indicating movement of such user computer device during the time period;

providing the movement data to the one or more classification machine-learned models comprises providing the respective movement data for each user computing device to the one or more machine-learned classification models; and comparing the visual data and the movement data comprises determining the correlation during the time period between the object depicted in the one or more images of the visual data and the particular user computing device based on the respective movement data indicating movement of the particular user computing device.

17. One or more non-transitory computer readable media that collectively store instructions that when executed by one or more processors cause the one or more processors to perform operations, the operations comprising:

obtaining visual data associated with one or more images depicting an object during a time period;

obtaining movement data associated with a user computing device during the time period;

providing the visual data and the movement data to one or more machine-learned classification models configured to identify similarities between the visual data and the movement data;

comparing, using the one or more machine-learned classification models, the visual data and the movement data to determine a correlation during the time period between the object depicted in the one or more images of the visual data and the user computing device associated with the movement data; and based on a determined correlation between the visual data and the movement data, identifying the object depicted in the one or more images as corresponding to a user of the user computing device.

18. The one or more non-transitory computer readable media of claim 17, wherein the operations further comprise:

receiving a request to initiate a service request; and transmitting a user computing device identifier corresponding to the user computing device and a request to process the service request to an account management computing system.

19. The one or more non-transitory computer readable media of claim 18, further comprising, wherein the operations further comprise:

receiving, from the account management computing system, data corresponding to one or more accounts of the particular user;

displaying at least a portion of the data corresponding to the one or more accounts of the particular user;

receiving an input of a selection of a particular account for use in the service request; and transmitting, to the account management computing system, the selection of the particular account, wherein the account management computing system processes the service request using the particular account.

20. The one or more non-transitory computer readable media of claim 18, further comprising, wherein the operations further comprise:

determining a change in position of the object from a first position to a second position during the time period determining that the second position of the object is within a defined area of a video feed associated with a service request area, wherein the request to process the service request is transmitted in response to determining that the second position of the object is within the service request area associated with the video feed.

* * * * *